(12) United States Patent
Jeong et al.

(10) Patent No.: US 11,881,134 B2
(45) Date of Patent: Jan. 23, 2024

(54) ELECTRONIC DEVICE AND METHOD FOR CONTROLLING THE SAME, AND STORAGE MEDIUM

(71) Applicant: SAMSUNG ELECTRONICS CO., LTD., Suwon-si (KR)

(72) Inventors: Soonmook Jeong, Suwon-si (KR); Kyeongwon Mun, Suwon-si (KR); Kyoungjae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 16/950,375

(22) Filed: Nov. 17, 2020

(65) Prior Publication Data
US 2021/0160401 A1 May 27, 2021

(30) Foreign Application Priority Data
Nov. 27, 2019 (KR) .................. 10-2019-0154198

(51) Int. Cl.
*G09G 3/20* (2006.01)
*H04N 5/14* (2006.01)
(Continued)

(52) U.S. Cl.
CPC .............. *G09G 3/20* (2013.01); *G06T 5/001* (2013.01); *H04N 5/144* (2013.01); *H04N 5/147* (2013.01);
(Continued)

(58) Field of Classification Search
CPC .......... H04N 5/21; H04N 5/144; H04N 5/147; G06T 5/001; G06T 2207/20004
(Continued)

(56) References Cited

U.S. PATENT DOCUMENTS 10,015,499 B1 7/2018 Hobbs
2004/0218787 A1* 11/2004 Tagami ................ H04N 5/144
348/E5.065
(Continued)

FOREIGN PATENT DOCUMENTS

EP 1585091 10/2005
KR 10-0768819 10/2007
(Continued)

OTHER PUBLICATIONS

International Search Report and Written Opinion dated Mar. 16, 2021 in corresponding International Application No. PCT/KR2020/016313.
(Continued)

*Primary Examiner* — Wednel Cadeau
(74) *Attorney, Agent, or Firm* — Nixon & Vanderhye P.C.

(57) ABSTRACT

Disclosed is an electronic device providing optimal image quality according to an image characteristic. The electronic device includes: interface circuitry and a processor configured to correct an image based on a plurality of frames acquired from a signal received through the interface circuitry based on whether the image has a predefined characteristic, wherein the processor is further configured to perform recognition of the predefined characteristic based on a frame in which a pixel change between two consecutive frames among the plurality of frames is greater than or equal to a threshold.

18 Claims, 22 Drawing Sheets
(8 of 22 Drawing Sheet(s) Filed in Color)

(51) Int. Cl.
   *H04N 5/21*   (2006.01)
   *G06T 5/00*   (2006.01)
(52) U.S. Cl.
   CPC ..... *H04N 5/21* (2013.01); *G06T 2207/20004* (2013.01)
(58) Field of Classification Search
   USPC .......................................................... 382/254
   See application file for complete search history.

(56) References Cited

U.S. PATENT DOCUMENTS

| | | | |
|---|---|---|---|
| 2006/0055827 A1 | 3/2006 | Kawahara | |
| 2007/0063947 A1 | 3/2007 | Kang | |
| 2009/0109290 A1* | 4/2009 | Ye | G09G 3/3611 |
| | | | 348/155 |
| 2009/0316962 A1* | 12/2009 | Sun | G06V 40/175 |
| | | | 382/118 |
| 2010/0157069 A1 | 6/2010 | Sakamaki | |
| 2014/0026068 A1* | 1/2014 | Park | H04N 21/41265 |
| | | | 715/748 |
| 2014/0126827 A1 | 5/2014 | Chen et al. | |
| 2015/0206472 A1 | 7/2015 | Chae et al. | |
| 2016/0343288 A1 | 11/2016 | Kim et al. | |
| 2017/0011490 A1 | 1/2017 | Park | |
| 2017/0142452 A1* | 5/2017 | Bae | H04N 19/182 |
| 2017/0278289 A1* | 9/2017 | Marino | G06T 7/536 |
| 2018/0018762 A1* | 1/2018 | Li | G06T 5/40 |
| 2018/0247600 A1 | 8/2018 | Kang et al. | |
| 2019/0230407 A1* | 7/2019 | Toma | H04N 9/8205 |

FOREIGN PATENT DOCUMENTS

| | | | |
|---|---|---|---|
| KR | 10-2008-0067241 | 7/2008 | |
| KR | 2008067241 A * | 7/2008 | |
| WO | WO-03088648 A1 * | 10/2003 | ............... G06T 7/20 |

OTHER PUBLICATIONS

European Search Report and Written Opinion dated Mar. 30, 2021 in corresponding Application No. 20207671.7.

* cited by examiner

11

12

12

22

32

41

52

62

72

81

82

ELECTRONIC DEVICE AND METHOD FOR CONTROLLING THE SAME, AND STORAGE MEDIUM

CROSS-REFERENCE TO RELATED APPLICATION

This application is based on and claims priority under 35 U.S.C. § 119 to Korean Patent Application No. 10-2019-0154198, filed on Nov. 27, 2019, in the Korean Intellectual Property Office, the disclosure of which is incorporated by reference herein in its entirety.

BACKGROUND

1. Field

The disclosure relates to an electronic device for automatically identifying optimal image quality according to an image characteristic, a method for controlling the same, and a storage medium.

2. Description of Related Art

In general, a computer or a television processes a received image through a certain image processing method regardless of an image characteristic and display the processed image on a screen. However, it is possible to obtain better image quality using different signal processing methods depending on the image characteristic, for example, a still image and a moving image. To this end, the existing image processing method includes extracting a color change amount between frames of an image to be displayed, determining the frames as a moving image when the extracted color change amount is equal to or greater than a reference value and the color change amount continues for a set time or more, and determining the frames as a still image when the color change amount is below the reference value or does not continue for the set time or longer, thereby performing image quality processing on the image and displaying the processed image on a screen.

SUMMARY

Embodiments of the disclosure provide an electronic device capable of improving optimal image quality, a method for controlling the same, and a storage medium in which a computer program is stored.

An electronic device according to an example embodiment of the disclosure is provided. The electronic device includes: interface circuitry and a processor configured to correct an image based on a plurality of frames acquired from a signal received through the interface circuitry based on whether the image has a predefined characteristic.

The processor may be configured to perform recognition of the predefined characteristic based on a frame in which a pixel change between two consecutive frames among the plurality of frames is greater than or equal to a threshold.

The processor may be configured to detect a pixel change area.

The pixel change area may be formed by connecting a plurality of outer pixels among pixels changed between the two consecutive frames.

The threshold may include a threshold of a ratio of the pixel change area to an effective screen area.

The processor may be configured to process an image, in which the ratio of the pixel change area is less the threshold, in a previous image quality mode.

The processor may be configured to process the image, in which the pixel change is less than the threshold, in the previous image quality mode.

The processor may be configured to compare a ratio of similar feature points to recognize the characteristic.

The recognition of the characteristic may include at least one of recognition of scene change information and recognition of motion information.

The processor may be configured to detect a black area of the effective screen displaying the two consecutive frames.

The processor may be configured to identify the frames as either a still image or a moving image based on a difference in the detected black area between the two consecutive frames.

The processor may be configured to identify whether a later frame of the two consecutive frames is a content image or a UI image.

The processor may be configured to identify whether the image is the still image or the moving image based on the characteristic recognition result.

The processor may be configured to detect a frame size of a still image, and perform additional characteristic recognition on a frame having a predetermined size or larger.

The additional characteristic recognition may include detection of least one of a target scene or a target object.

The processor may be configured to classify and map the target scene or the target object into a predefined class according to the detection of at least one of the target scene and the target object.

An electronic device according to an example embodiment of the disclosure is provided. The electronic device includes: interface circuitry and a processor configured to correct an image based on a plurality of frames acquired from a signal received through the interface circuitry based on whether the image has a predefined characteristic.

The processor may be configured to: detect each black area of an effective screen displaying two consecutive frames in which the pixel change is greater than or equal to a threshold, and identify whether the image is the still image or the moving image based on the detected black area of the effective screen of the two frames.

The image may include a mirrored image of the image displayed by an external device.

A method for controlling an electronic device according to an example embodiment of the disclosure is provided. A method for controlling an electronic device includes: receiving a signal and correcting an image based on whether an image based on a plurality of frames acquired from the received signal has a predefined characteristic.

The correcting of the image may include performing recognition of the predefined characteristic based on a frame in which a pixel change between two consecutive frames among the plurality of frames is greater than or equal to a threshold.

A non-transitory computer-readable storage medium according to an example embodiment of the disclosure in which a computer program executable by a computer is stored is provided. The computer program, when executed, may provide detection of a pixel change between two consecutive frames in an image based on a plurality of frames, and recognition of a predefined characteristic based on a frame in which the pixel change is greater than or equal to a threshold.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following detailed description, taken in conjunction with the accompanying drawings, in which.

DETAILED DESCRIPTION

Figure 1:
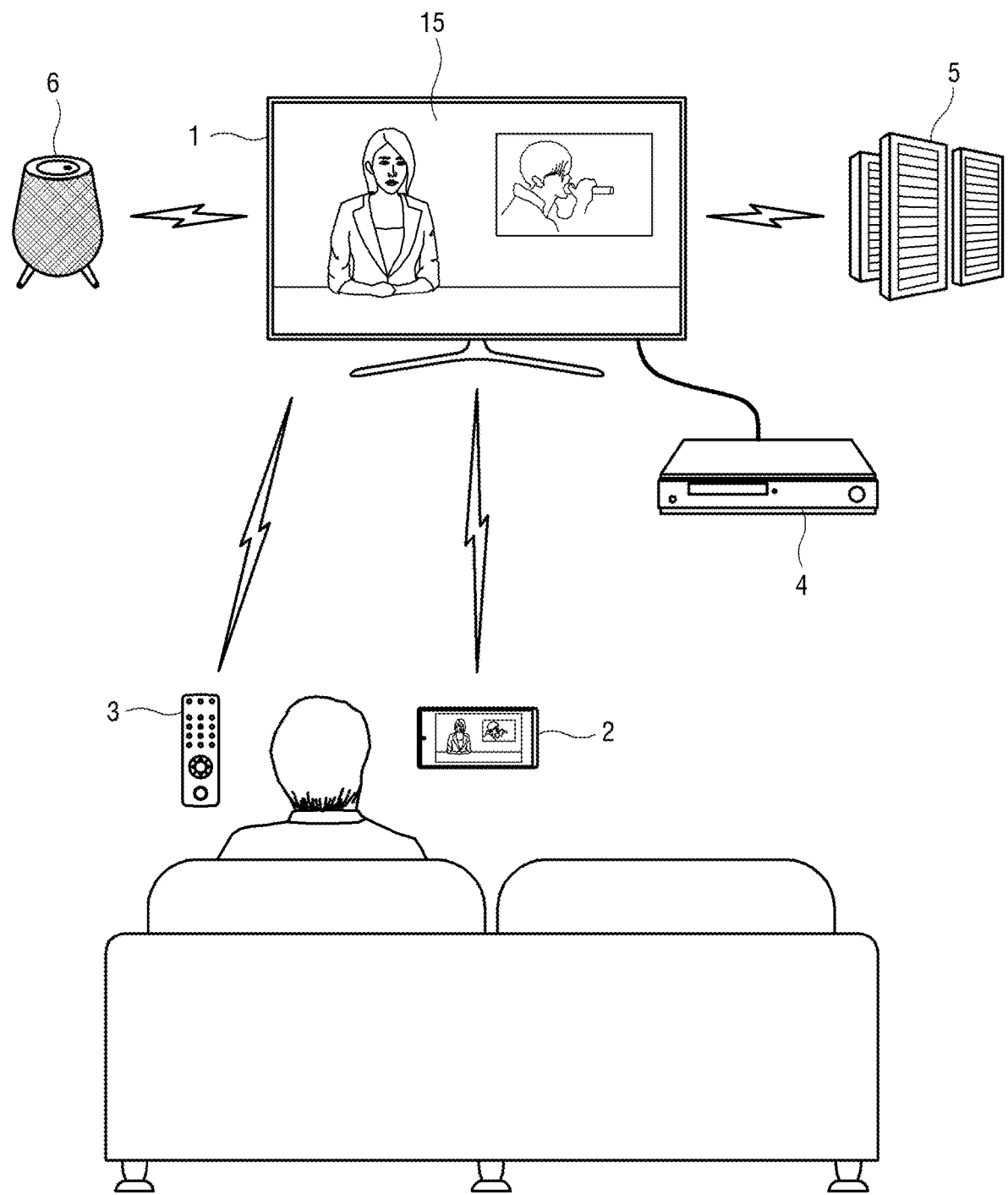
FIG. 1 is a diagram illustrating an example image display scenario of an electronic device according to various embodiments.

Hereinafter, various example embodiments of the disclosure will be described in greater detail with reference to the accompanying drawings. In the drawings, the same reference numbers or signs refer to components that perform substantially the same function, and the size of each component in the drawings may be exaggerated for clarity and convenience. However, the disclosure os not limited to the configuration or operation described in the following examples. In describing the disclosure, if it is determined that a detailed description of known technology or a configuration related to the disclosure may unnecessarily obscure the subject matter of the disclosure, the detailed description thereof may be omitted.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of (1) a case in which at least one A is included, (2) a case in which at least one B is included, or (3) a case in which both of at least one A and at least one B are included.

In embodiments of the disclosure, terms including ordinal numbers such as first and second are used simply for the purpose of distinguishing one component from other components, and singular expressions include plural expressions unless the context clearly indicates otherwise.

In addition, in the embodiment of the disclosure, terms such as 'top', 'bottom', 'left', 'right', 'inside', 'outside', 'inner surface', 'outer surface', 'front', and 'rear' are defined based on the drawings, and shapes or positions of each component are not limited thereby.

An expression "configured (or set) to" used in the disclosure may be used interchangeably with an expression "suitable for", "having the capacity to" "designed to", "adapted to", "made to", or "capable of" depending on a situation. A term "configured (or set) to" may not necessarily refer to "specifically designed to" in hardware. Instead, an expression "an apparatus configured to" may refer to what the apparatus may "do" together with other apparatuses or components. For example, a "sub-processor configured (or set) to perform A, B, and C" may refer, for example, to a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

An electronic device according to various embodiments of the disclosure may include, for example, and without limitation, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a wearable device, or the like, that process an image. In various embodiments, the electronic device may include at least one of, for example, and without limitation, a Blu-ray player, a digital video disk (DVD) player, a set-top box, a home automation control panel, a home automation control panel, a security control panel, a media box, a game console, an electronic dictionary, a camcorder, a digital photo frame, or the like.

In an embodiment, the electronic device may include, for example, and without limitation, at least one of a navigation device, a global navigation satellite system (GNSS), an event data recorder (EDR), a flight data recorder (FDR), a vehicle infotainment device, an electronic equipment for ships (for example, a navigation device for ships, a gyro compass, and the like), avionics, a security device, a vehicle head unit, or the like.

In the disclosure, the term "user" may refer to a person using the electronic device 1 or a device (for example, an artificial intelligence electronic device) using the electronic device 1.

FIG. 1 is a diagram illustrating an example image display scenario of the electronic device 1 according to various embodiments.

Referring to FIG. 1, the electronic device 1 may display a screen of a mobile device 2 on a display unit 15 as screen mirroring. The electronic device 1 is not limited only to the image display by the screen mirroring.

The electronic device 1 needs to provide an optimal image quality in response to various user scenarios, screen effects, configurations, and the like that may be displayed on the mobile device 2. The electronic device 1 does not simply classify a screen as video quality, for example, just because the moving image is played on the screen, but may detect a played frame size and check a motion and scene change when the frame size is equal to or larger than a certain size. When the motion and scene change are detected, the electronic device 1 may determine whether the played frame is a still image or a moving image by performing image characteristic recognition.

When the frame is below a certain size, the electronic device 1 may process the frame in a previous image quality mode without performing the characteristic recognition. For example, a screen including a small-sized moving image such as a thumbnail is usually displayed with text. It is difficult to distinguish whether an area on which a user concentrates is a moving image or text. Even if the image including the thumbnail is processed as the moving image, the effect may be insignificant, and a user may not view the moving image with great concentration, but view the moving image briefly. Since most moving images maintain similar screens for a certain period of time, it is not necessary to perform recognition every frame, and the recognition is performed only when there is a sudden change in image to lower a misrecognition rate, reduce CPU computational capacity and an occupancy rate, and the like, thereby providing an advantage in securing shared resources. In addition, the sudden change in image needs to be checked because a scene may be switched to home or other screen by ending a moving image application.

As an embodiment, when a user moves a paused image, such as a photograph, in the mobile device 2 by manipulation, even if a sudden change in image is detected, the electronic device 1 may process the paused image as a still image.

The mobile device 2 may be installed with a remote control application for controlling the electronic device 1. In addition, the mobile device 2 may include a microphone that receives a user voice. The mobile device 2 may receive a user's analog voice signal through a built-in microphone, digitize the analog voice signal, and transmit the digitized voice signal to the electronic device 1. The mobile device 2 may include a voice recognition function for self-recognizing the received voice.

The remote control 3 may include a microphone that receives a user's voice command. The remote control 3 may digitize the analog voice signal and transmit the digitized voice signal to the electronic device 1 via, for example, Bluetooth.

The set-top box 4 may provide image content or voice content to the electronic device 1 and display or output the image content or voice content.

The server 5 may include a content server that provides content to the electronic device 1 or a voice recognition server that provides a voice recognition service.

An AI speaker 6 may be installed with an app that controls peripheral devices, such as a television and IoT devices. The AI speaker 6 may be equipped with a voice recognition assistant that performs receiving and recognizing a user's voice command and performs an operation according thereto. The AI speaker 6 may transmit an image processed according to the user command to the electronic device 1 and display the image. The speaker 6 may display the image content including a display by itself.

As described above, the electronic device of the disclosure may provide an image of optimized image quality by considering a screen mirroring user scenario.

Figure 2:
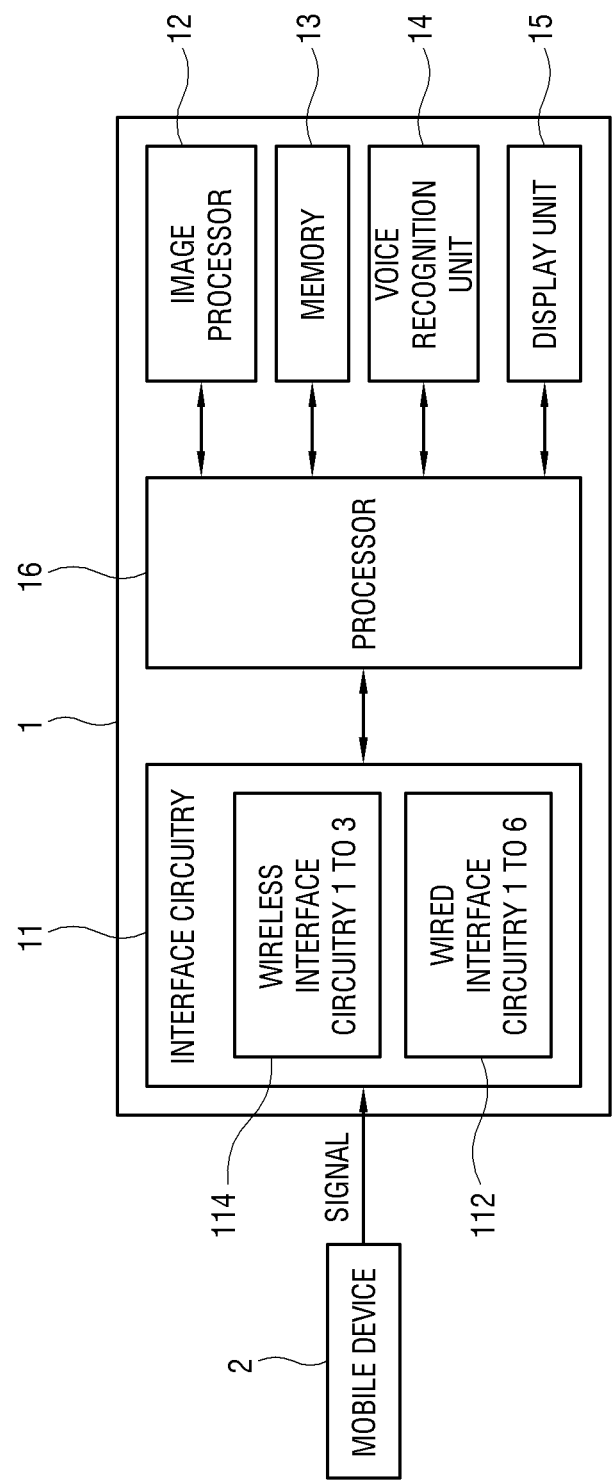
FIG. 2 is a block diagram illustrating an example configuration of an electronic device according to various embodiments.

FIG. 2 is a block diagram illustrating an example configuration of the electronic device 1 according various embodiments.

Referring to FIG. 2, the electronic device 1 may include interface circuitry 11 that may transmit and receive various data to and from the mobile device 2.

The interface circuitry 11 may include wired interface circuitries 1 to 6 112 and wireless interface circuitries 1 to 3 114.

The wired interface circuitry 1 may include a terrestrial/satellite broadcasting antenna connection tuner, a connection interface for a cable broadcasting cable, and the like for receiving a broadcast signal.

The wired interface circuitry 2 may include HDMI, DP, DVI, Component, S-Video, composite (RCA terminal), and the like for connecting an image device.

The wired interface circuitry 3 may include a USB interface or the like for a general-purpose electronic device connection.

The wired interface circuitry 4 may include a connection interface for an optical cable device.

The wired interface circuitry 5 may include an audio device connection interface such as a headset, earphones, and external speakers.

The wired interface circuitry 6 may include a connection interface for wired network devices such as Ethernet.

The wireless interface circuitry 1 may include a connection interface for wireless network devices such as Wi-Fi, Bluetooth, ZigBee, Z-wave, RFID, WiGig, WirelessHD, ultra-wide band (UWB), wireless USB, and near field communication (NFC).

The wireless interface circuitry 2 may include an IR transmission/reception module for transmitting and/or receiving a remote control signal.

The wireless interface 3 may include a connection interface for mobile communication devices such as 2G to 5G.

The interface circuitry 11 may include a dedicated communication module including various communication circuitry for performing communication exclusively for each of the mobile device 2 and the server.

The interface circuitry 11 may include a common communication module and the like for performing communication with both the mobile device 2 and the server. For example, both the mobile device 2 and the server may perform communication through the Wi-Fi module.

The interface circuitry 11 may include input interface circuitry and output interface circuitry. In this case, the input interface circuitry and the output interface circuitry may be integrated into one module or may be implemented as separate modules.

The electronic device 1 may include an image processor (e.g., including image processing circuitry) 12 that processes the image received through the interface circuitry 11.

The image processor 12 may include various image processing circuitry and performs various image processing processes on the image signal received by the interface circuitry 11. A kind of image processing processes performed by the image processor 12 is various, and may include, for example, decoding corresponding to an image format of image data, de-interlacing that converts interlace type image data into a progressive scheme, scaling that adjusts the image data to a preset resolution, noise reduction that improves image quality, detail enhancement, frame refresh rate conversion, and the like.

The image processor 12 may display the image signal that is subjected to the process on the display unit 15 embedded in the electronic device 1 or outputs the displayed image signal to an external display device 7 to display an image based on the corresponding image signal.

The electronic device 1 may include a memory 13.

The memory 13 may include, for example, a storage medium readable by a computer and stores data without limitation. The memory 13 is accessed by the processor 16, and performs operations such as reading, writing, modifying, deleting, and updating data by the processor 16.

The memory 13 may store various contents received from the mobile device 2, the set-top box 4, the server 5, the USB, and the like.

The data stored in the memory 13 may include various image/audio contents received through the interface circuitry 11 and a plurality of frame data sequentially displayed by processing the received image. The memory 13 may include a voice recognition module (voice recognition engine) for voice recognition.

The memory 13 may include an operating system, various applications executable on the operating system, image data, additional data, and the like.

The memory 13 may include a nonvolatile memory in which a control program is installed, and a volatile memory in which at least a part of the installed control program is loaded.

The memory 13 may include at least one storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The electronic device 1 may include a voice recognition unit (e.g., including voice recognition circuitry) 14.

The voice recognition unit 14 may execute the voice recognition module stored in the first memory 13 to recognize a voice that is input or transmitted from a microphone embedded in the electronic device 1 and a microphone embedded in the mobile device 2 or the remote control 3.

In the case of receiving the voice from the microphone embedded in the mobile device 2 or the remote control 3, the mobile device 2 or the remote control 3 may digitize an analog voice signal and transmit the digitized voice signal to the electronic device 1 through, for example, Bluetooth.

When receiving a voice signal from the microphone embedded in the electronic device 1 itself, the received analog voice signal may be digitized and transmitted to the processor 16 of the electronic device 1.

The electronic device 1 may transmit the received voice signal to the server. In this case, the server may be a speech to text (STT) server that converts voice signal related data into an appropriate text or a main server that also performs an STT server function.

The data processed by the STT server may be received again by the electronic device 1 or may be directly transmitted to another server.

The electronic device 1 may process the received voice signal by itself within the electronic device 1 without transmitting the received voice signal to the STT server. That is, the electronic device 1 may serve as an STT server by itself.

The electronic device 1 may perform a specific function using text transmitted from the server or text converted by itself. In this case, the processor 16 in the electronic device 1 may perform the function, or a separate server (a server different from the STT server or a server serving as an STT server) to which the converted text is transmitted may perform the function.

The electronic device 1 may include the display unit (e.g., including a display) 15.

The display unit 15 may display an image processed by the image processor 12.

The implementation scheme of the display unit 15 is not limited, and the display unit 15 may be implemented in various display panels such as liquid crystal, plasma, a light-emitting diode, an organic light-emitting diode, a surface-electron gun conduction electron-emitter, carbon nanotube, nano-crystal, etc.

The display unit 15 may additionally include an additional component according to the implementation scheme. For example, the display may include an LCD panel, an LCD panel driver for driving the LCD panel, and a backlight unit for supplying light to the LCD panel.

The processor (e.g., including processing circuitry) 16 may include various processing circuitry and control each component of the electronic device 1.

The processor 16 may identify whether an image based on a plurality of frames acquired from the signal received through the interface circuitry 11 has a predefined characteristic.

The processor 16 may correct an image to provide the optimal image quality according to the image characteristic.

The processor 16 may detect a pixel change between two consecutive frames among a plurality of frames. The processor 16 may perform the recognition of the predefined characteristic on a frame in which the detected pixel change is equal to or greater than a first threshold. The 'threshold' may be represented as a 'preset value' or a 'threshold'.

The processor 16 may not perform the recognition of the defined characteristic on a frame in which the detected pixel change is below the threshold and may display the frame in the predefined image quality mode. The first threshold of the pixel change may be set as the number of changed pixels.

The processor 16 may calculate an image difference between the acquired two consecutive frames in units of pixels, and when there is a difference by more than a certain amount, detect a pixel change area in which the difference occurs. The processor 16 may detect a frame area that is based on the detected pixel change area. When the detected frame area is equal to or smaller than a certain size, the processor 16 may classify the image characteristic as a still image, and when the frame area is equal to or larger than a certain size, the processor 16 may perform frame analysis.

The processor 16 may detect a ratio of similar feature points of the two consecutive frames prior to performing the frame analysis. When the ratio of the similar feature points is equal to or less than the second threshold, the processor 16 may identify that the scene change is made, and when the similar feature point ratio exceeds the second threshold, the processor may identify that the scene change is not made. If the current frame is identified as not performing the scene change, the processor 16 may maintain the existing image quality mode without performing the characteristic recognition and detect the pixel change for the next frame.

When the scene change is detected, the processor 16 may extract vector information from two frames, recognizes motion information from the extracted vector information, and recognizes a screen state such as a motion size and ratios for each recognition direction.

The processor 16 may identify the screen information by performing the characteristic recognition on the current frame among the two consecutive frames. In this case, the processor 16 may identify whether the frames are a general content image or a UI image using a deep learning-based learned model.

In an embodiment, the frame to be subjected to the characteristic recognition may be content in the entire thereof.

In an embodiment, the frames to be subjected to the characteristic recognition may be an EPG in which the entire frames include a UI.

In an embodiment, the frames to be subjected to the characteristic recognition may be an EPG in which some area of the entire frames is a UI image or mixed-UI and content.

In an embodiment, the frames to be subjected to the characteristic recognition may be UI or text in the entire thereof.

In an embodiment, the frames to be subjected to the characteristic recognition may be frames displayed in a picture in picture (PIP) mode.

In an embodiment, the frames to be subjected to the characteristic recognition may include at least one thumbnail in the entire frames include a UI or text.

In an embodiment, the processor 16 may detect and compare black areas within an effective screen in which the two consecutive frames are displayed, respectively. When a rate of change in the black areas within the effective screen in which each of the two frames is displayed is greater than a predetermined fourth threshold, the processor 16 may process the frames as a still image.

The processor 16 may identify an image characteristic, that is, a still image or a moving image, from the screen state subjected to the characteristic recognition and the screen information. However, when an image is a still image and has frames larger than a certain size, the processor 16 may additionally perform the image characteristic recognition by regarding the image as a target from which detailed characteristic information may be extracted.

When a target scene or a target object is detected as a result of the image characteristic recognition, the processor 16 may subdivide the target scene or the target object into a corresponding image characteristic, and when the target scene or the target objects is not detected, the processor 16 may process the target scene or the target object as the general still image characteristic recognized in advance. The recognized characteristic may be mapped to a predefined image quality mode. The result mapped in this way may be accumulated in an image quality mode stack. In this case, when accumulated more than a certain number of times, an image quality mode that wins the most votes may be finally selected from the accumulated image quality modes.

The processor 16 may repeat the above-described process for a newly acquired frame and a previous frame.

The processor 16 may collect data for generating a model that recognizes a frame characteristic, that is, whether the frames are a content image or a UI image, and may perform at least a part of data analysis, processing, and generation of result information using at least one of machine learning, a neural network, or a deep learning algorithm as a rule-based or artificial intelligence algorithm.

For example, the processor 16 may perform functions of a learning unit and a recognition unit. The learning unit may perform, for example, a function of generating a trained neural network, and the recognition unit may perform a function of recognizing (or reasoning, predicting, estimating, and determining) data using the trained neural network. The learning unit may generate or update the neural network. The learning unit may obtain learning data to generate the neural network. For example, the learning unit may acquire the learning data from the first memory 13 or the outside. The learning data may be data used for learning a neural network.

Before learning the neural network using the learning data, the learning unit may perform a pre-processing operation on the obtained learning data, or select data to be used for learning from among a plurality of learning data. For example, the learning unit may process or filter the learning data in a predetermined format, or process data in a form suitable for learning by adding/removing noise. The trained neural network may include a plurality of neural networks (or layers). The nodes of the plurality of neural networks have weights, and the plurality of neural networks may be connected to each other so that an output value of one neural network is used as an input value of other neural networks. Examples of the neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like.

In order to recognize the frame characteristic, the recognition unit may obtain target data. The target data may be obtained from the memory 13 or the outside. The target data may be data to be recognized by the neural network. Before applying the target data to the trained neural network, the recognition unit may perform the pre-processing operation on the obtained target data, or select data to be used for recognition from among the plurality of target data. For example, the recognition unit may process or filter the target data in a predetermined format, or process data in a form suitable for recognition by adding/removing noise. The recognition unit may obtain an output value output from the neural network by applying the pre-processed target data to the neural network. According to various embodiments, the recognition unit may acquire a probability value (or a reliability value) together with the output value.

The processor 16 includes at least one general-purpose processor that loads at least a part of the control program including instructions from the nonvolatile memory, in which the control program is installed, into the volatile memory and executes the loaded instructions of the control program, and may be implemented as, for example, a central processing unit (CPU), an application processor (AP), or a microprocessor.

The processor 16 may include a single core, a dual core, a triple core, a quad core, or a multiple-number core thereof. A plurality of processors 16 may be provided. The processor 16 may include, for example, a main processor and a sub processor operating in a sleep mode (for example, a mode in which only standby power is supplied). In addition, the processor, the ROM, and the RAM can be interconnected via an internal bus.

The processor 16 may be implemented as a form included in a main SoC mounted on a PCB embedded in the electronic device 1. In an embodiment, the main SoC may further include an image processor.

The control program may include a program(s) implemented in at least one of a BIOS, a device driver, an operating system, firmware, a platform, and an application program (application). The application program may be pre-installed or pre-stored at the time of manufacturing of the electronic device 1, or may be installed based on data of the application program received from the outside when used later. The data of the application program may be downloaded to the electronic device 1 from an external server such as an application market. The control program, the external server, or the like is an example of a computer program product, but is not limited thereto.

Figure 3:
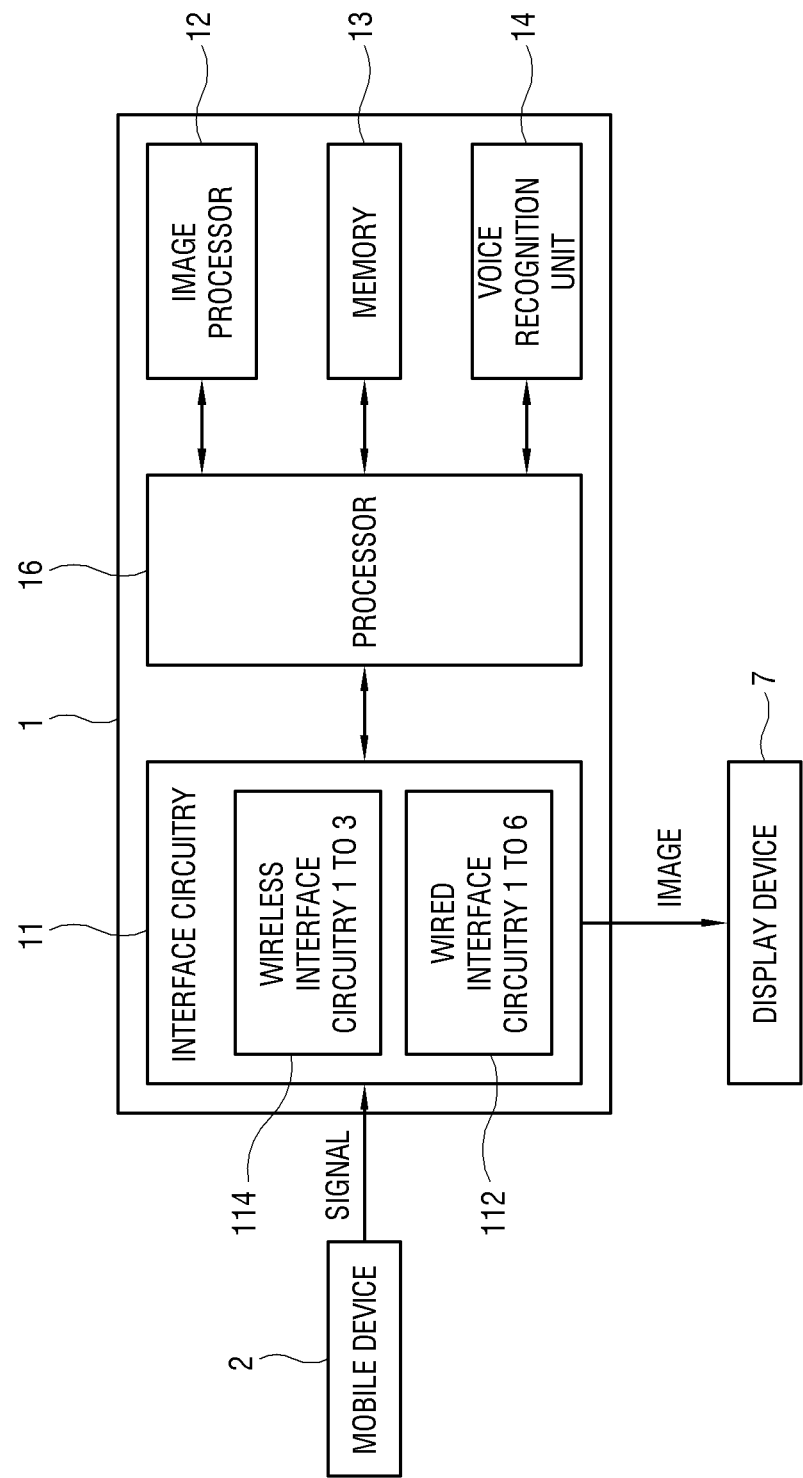
FIG. 3 is a block diagram illustrating an example configuration of an electronic device according to various embodiments.

FIG. 3 is a block diagram illustrating an example configuration of an electronic device 1 according to various embodiments. Referring to FIG. 3, in the electronic device 1, a display unit that displays an image by itself is excluded, and may output the processed image content to the display device (e.g., including a display) 7, for example, a television or a monitor through the interface circuitry 11, for example HDMI. The electronic device 1 may include the display unit that displays a simple notification, a control menu, or the like.

Figure 4:
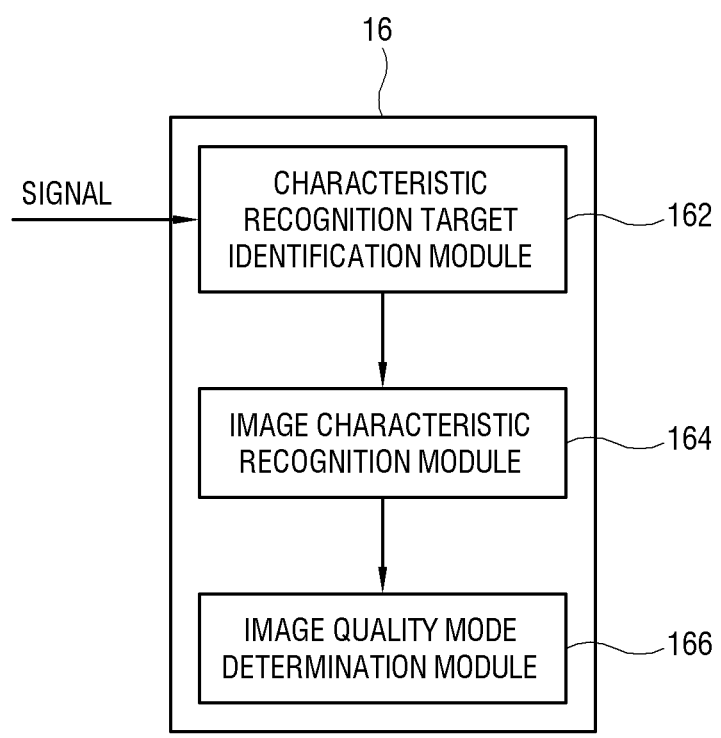
FIG. 4 is a block diagram illustrating an example configuration of processing an image in an optimal quality mode according to various embodiments.

FIG. 4 is a block diagram illustrating an example configuration of processing an image in an optimal quality mode according to various embodiments.

Referring to FIG. 4, the processor 16 may include a characteristic recognition target identification module (e.g., including processing circuitry and/or executable program elements) 162, an image characteristic recognition module (e.g., including processing circuitry and/or executable program elements) 164, and an image quality mode determination module (e.g., including processing circuitry and/or executable program elements) 166.

The characteristic recognition target identification module 162 may include various processing circuitry and/or executable program elements and determine whether the image input to the electronic device 1 is subjected to characteristic recognition. The electronic device 1 may sequentially display a plurality of frames of an image on the display unit 15. Each frame includes pixels, which are a smallest display unit.

The characteristic recognition target identification module 162 may select two consecutive frames among a plurality of frames and detect a pixel change between the two frames.

The characteristic recognition target identification module 162 may identify the detected pixel change as a characteristic recognition target when the detected pixel change is equal to or greater than a predetermined first threshold, and may apply and display a previous image quality mode when the detected pixel change is below the first threshold. Here, the first threshold may be set as the number of change in pixels relative to the total number of pixels of the frame. The characteristic recognition target identification module 162 may detect a pixel change area for a current frame in which the pixel change is equal to or greater than the predetermined first threshold. In this case, the pixel change area may be formed by connecting outer pixels among pixels changed between the two frames. The characteristic recognition target identification module 162 may extract a frame to which the pixel change area belongs, and determine the extracted frame as a characteristic recognition target when the size of the extracted frame is equal to or greater than a predetermined second threshold and exclude the extracted frame from the characteristic recognition target when the size of the extracted frame is below the predetermined second threshold. Here, the second threshold may be set as a ratio of the size of the extracted frame to an effective screen.

The image characteristic recognition module 164 may include various processing circuitry and/or executable program elements and identify whether a scene is changed through detection of a ratio of similar feature points with respect to a frame identified as a recognition target. When the scene change is identified, the image characteristic recognition module 164 may extract vector information from the two input frames and recognize motion information from the extracted vector information to recognize a screen state such as the size of the motion and the ratios for each recognition direction.

When the scene change is identified, the image characteristic recognition module 164 recognizes screen information by performing image recognition on the current frame among two consecutive frames. In this case, the image recognition may identify whether the frames are a general content image or a UI image using a deep learning-based learned model.

In an embodiment, the image characteristic recognition module 164 may detect a black area of the effective screen displaying the two consecutive frames. In this case, when the ratio of change in the black area of the two frames is equal to or greater than a predetermined fourth threshold, a still image has moved within the screen, so the frames may be processed as the still image even if the scene change is large.

The image characteristic recognition module 164 may determine whether the current frame is a still image or a moving image based on screen information and black area information.

The image quality mode determination module 166 may include various processing circuitry and/or executable program elements and classify and map the still image and the moving image determined by the image characteristic recognition module 164 into a predefined image quality mode, and store each mapped image quality mode in a stack. For example, the still image may include UI, Web, Text, Gallery, and the like. These still images may be classified into a plurality of classes through additional characteristic recognition, a target scene, or target object recognition, mapped to the predefined image quality mode, and stored in the quality mode stack.

In an embodiment, the image quality mode determination module 166 may identify whether the still image is an entire still image or a partial moving image including a small moving image such as a thumbnail.

The image quality mode determination module 166 may select and apply image quality modes mapped in the largest number among the image quality modes stored in the image quality mode stack as a final image quality mode.

Figure 5:
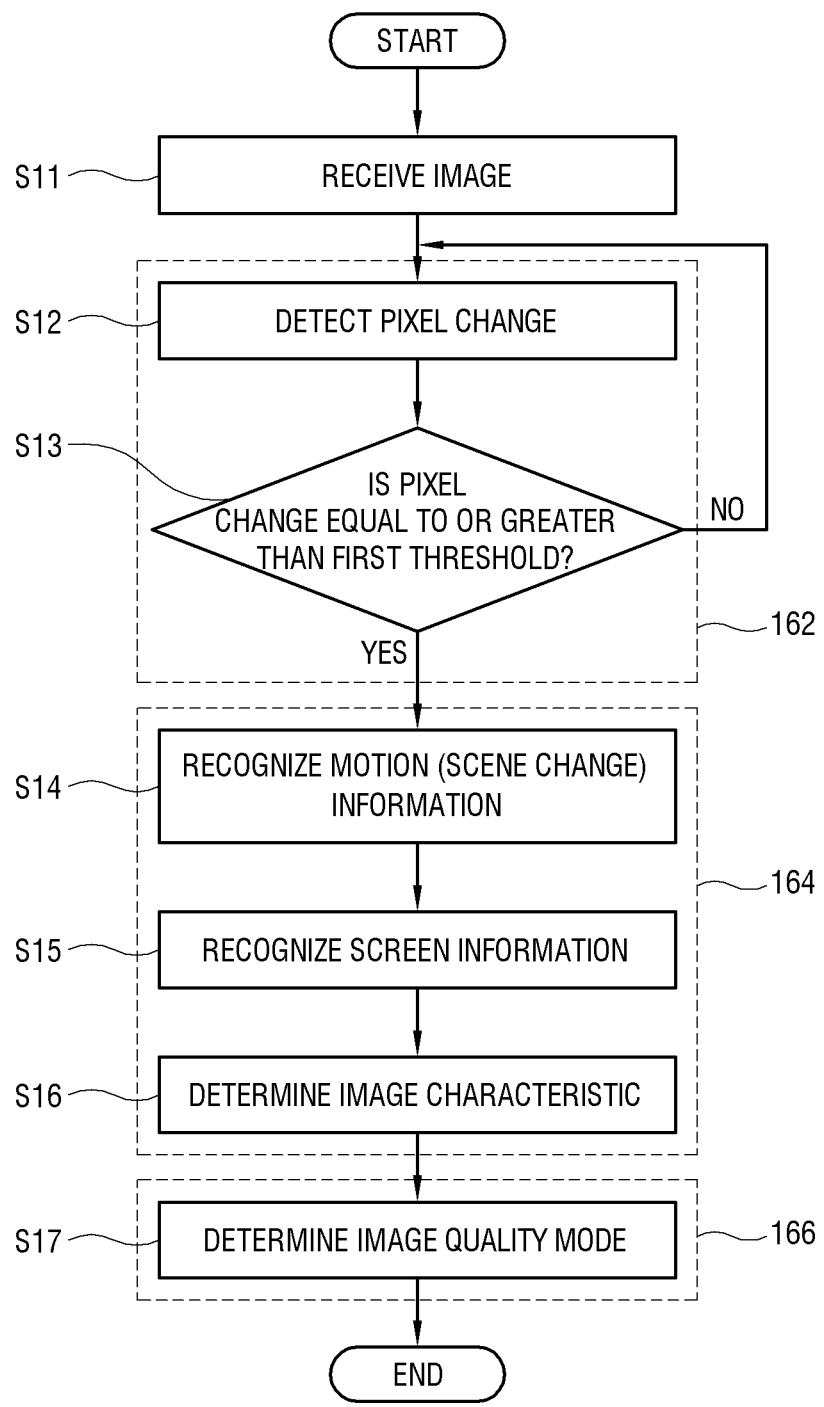
FIG. 5 is a flowchart illustrating an example method for processing an image in an optimal quality mode according to various embodiments.
Figure 6:
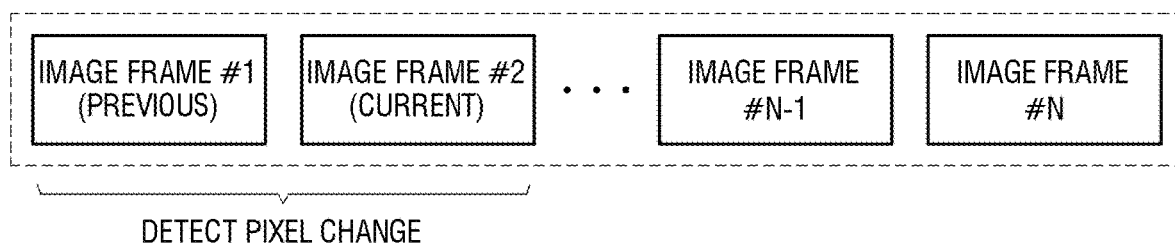
FIG. 6 is a diagram illustrating an example structure of an image signal according to various embodiments.

FIG. 5 is a flowchart illustrating an example method for processing an image in an optimal quality mode according to various embodiments, and FIG. 6 is a diagram illustrating an example structure of an image signal according to various embodiments.

In operation S11, the electronic device 1 may receive an image through the interface circuitry 11. The received image may include a plurality of frames #1 to #N as illustrated in FIG. 6. The plurality of frames #1 to #N may be sequentially displayed in units of one frame.

In operation S12, the characteristic recognition target identification module 162 may detect a pixel change between continuous previous frame #1 and current frame #2 among the plurality of frames #1 to #N illustrated in FIG. 6. That is, the characteristic recognition target identification module 162 may detect different pixels by comparing pixels of the previous frame #1 with pixels of the current frame #2.

In operation S13, the characteristic recognition target identification module 162 may identify whether the pixel change in operation S12 is equal to or greater than a first threshold. When the pixel change is less than the first threshold ("No" in operation S13), the characteristic recognition target identification module 162 may not perform image characteristic recognition in operation S14, apply the previous image quality mode, and detect the pixel change between the next two frames #2 and #3. When the pixel change is equal to or greater than the first threshold ("Yes" in operation S13), the characteristic recognition target identification module 162 may perform image characteristic recognition in operation S14. Here, the first threshold may be set as the number of pixels of the current frame #2 that are different from the pixels of the previous frame #1.

In operation S14, when the pixel change is equal to or greater than the first threshold, the image characteristic recognition module 164 may extract vector information from the two input frames and recognize motion information from the extracted vector information to recognize a screen state such as the size of the motion and the ratios for each recognition direction.

The image characteristic recognition module 164 recognizes screen information by performing the image recognition on the current frame among the two consecutive frames. The image characteristic recognition module 164 may use a deep learning-based learned model and may identify image information as to whether the frames are a content image or a UI image.

In operations S15 and S16, the image characteristic recognition module 164 may recognize screen information and determine whether the current frame #2 is a still image or a moving image based on the above-described screen state and screen information.

In operation S17, the image quality mode determination module 166 may determine an image quality mode suitable for the current frame #2 corresponding to the still image or the moving image identified by the above-described method.

The electronic device 1 according to the first embodiment of the disclosure may perform the image characteristic recognition only on the frames in which the pixel change of a predetermined threshold or greater are detected for all of the plurality of frames of the received image, thereby lowering the misrecognition rate, reducing the CPU computational capacity and occupancy rate, and the like.

Figure 7:
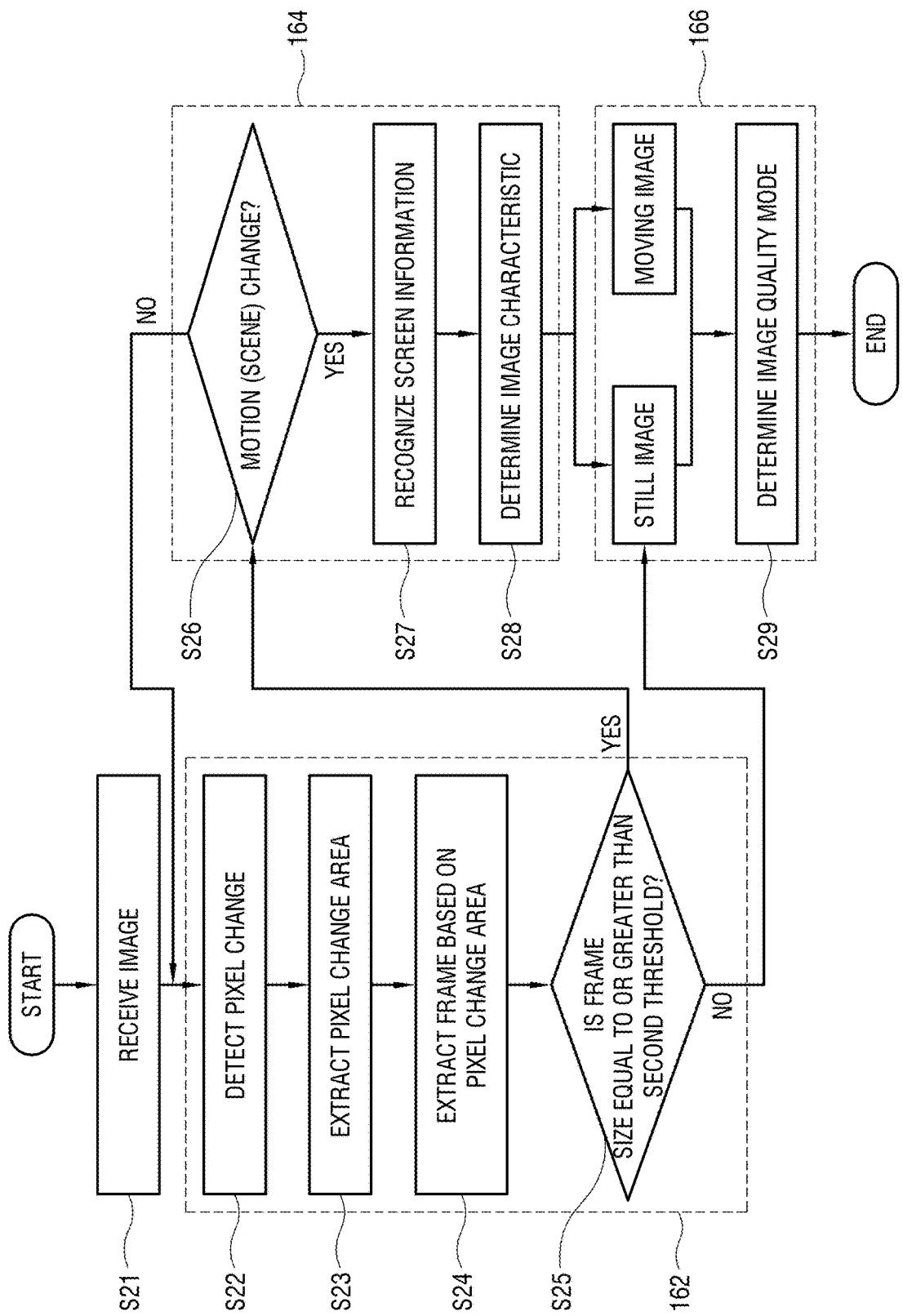
FIG. 7 is a flowchart illustrating an example method for processing an image in an optimal quality mode according to various embodiments.
Figure 8:
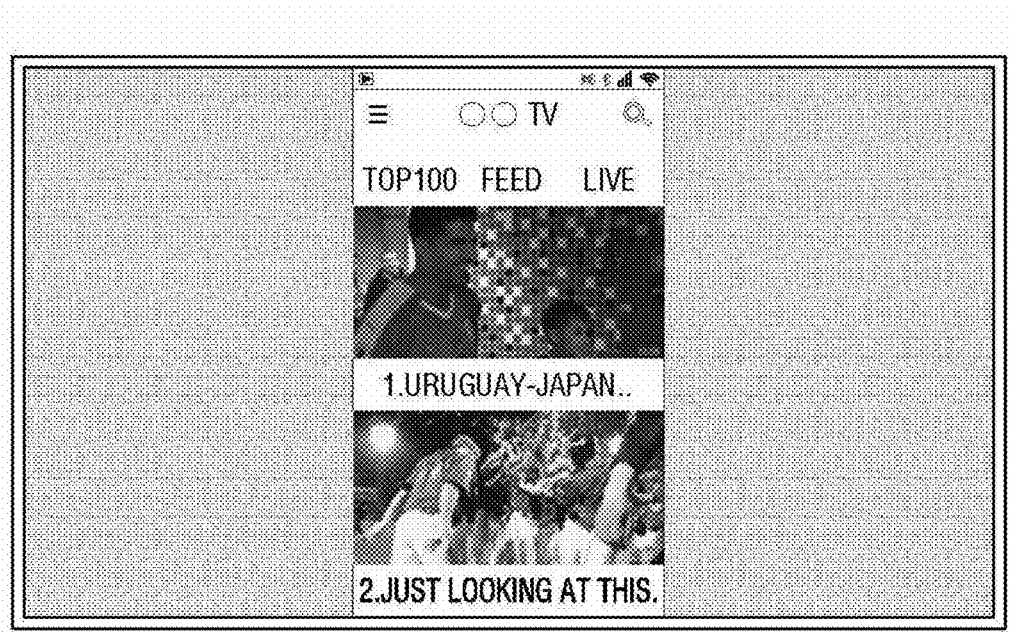
FIG. 8 is a diagram illustrating a previous frame #11 according to various embodiments.
Figure 9:
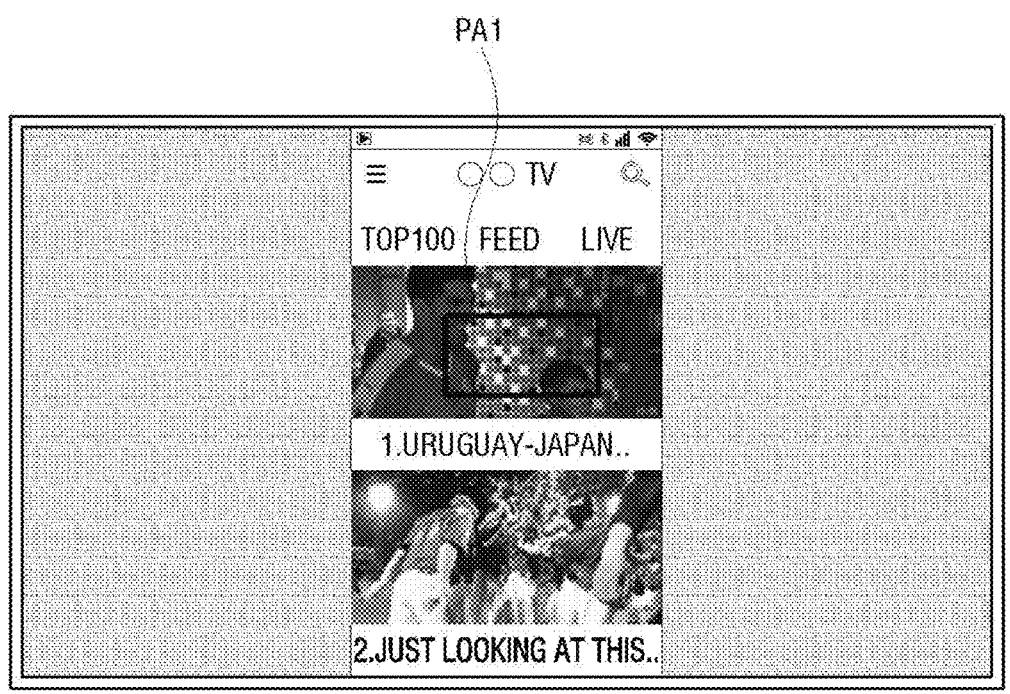
FIG. 9 is a diagram illustrating an example pixel change area of a current frame #12 according to various embodiments.
Figure 10:
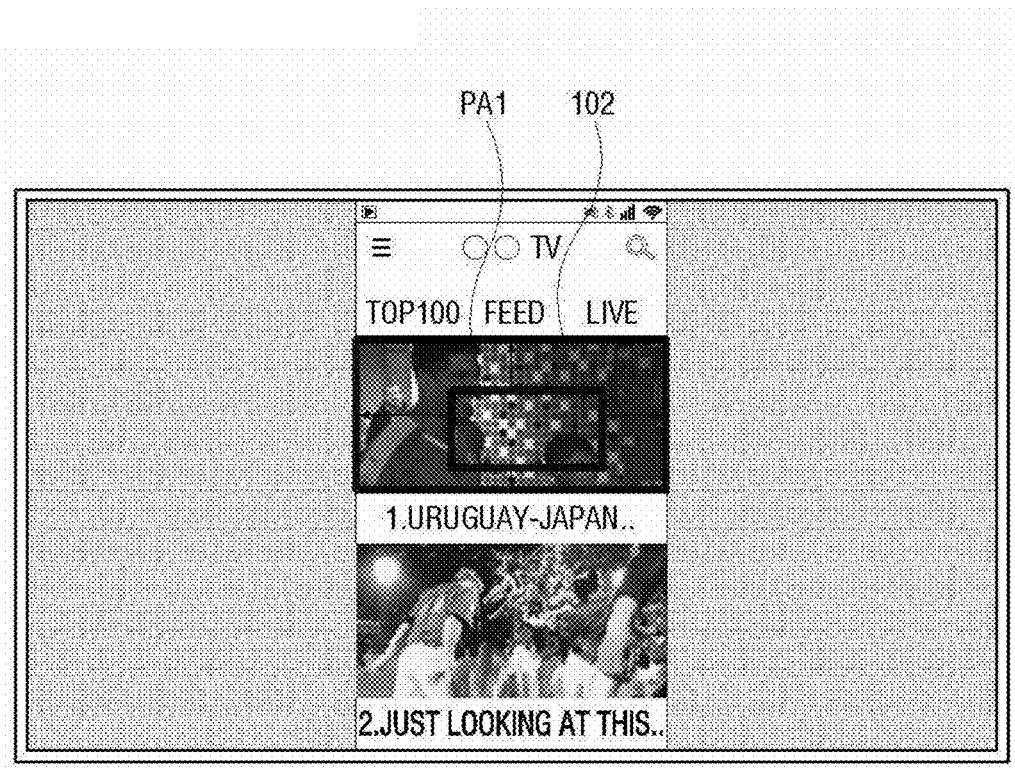
FIG. 10 is a diagram illustrating an example pixel change frame of the current frame #12 according to various embodiments.

FIG. 7 is a flowchart illustrating an example method for processing an image in an optimal image quality mode according to various embodiments, FIG. 8 is a diagram illustrating a previous frame #11, and FIGS. 9 and 10 are diagrams illustrating an example pixel change area and a pixel change frame of the current frame #12 according to the embodiment of the disclosure.

In operation S11, the electronic device 1 may receive an image including a plurality of frames #11 to #1N through the interface circuitry 11.

In operation S22, the characteristic recognition target identification module 162 may detect a pixel change between continuous previous frame #11 and current frame #12 among the plurality of frames #11 to #1N illustrated in FIG. 6. That is, the characteristic recognition target identification module 162 may detect different pixels by comparing pixels of the previous frame #11 with pixels of the current frame #12.

In operation S23, the characteristic recognition target identification module 162 may extract a pixel change area PA1 of the current frame #12. The pixel change area PA1 may be formed by connecting outermost pixels among the changed pixels of the current frame #12. FIG. 9 includes the pixel change area PA1 of the current frame #12 that is different from the previous frame #11 of FIG. 8. The pixel change area PA1 may be formed by connecting outermost pixels among the changed pixels. The pixel change area PA1 is formed as a quadrangular area in FIG. 9, but may be a circular, polygonal, or irregular area.

In operation S24, the characteristic recognition target identification module 162 may extract the pixel change frame 102 based on the pixel change area PAL Referring to FIG. 10, the pixel change frame 102 may be set as a continuous content area including the pixel change area PA1 as a part of the current frame #12. In this case, the pixel change frame 102 may be the same as the pixel change area PA1 or the current frame #12.

In operation S25, the characteristic recognition target identification module 162 may determine whether the pixel change frame 102 is equal to or greater than the second threshold. Here, the second threshold may be set as an area ratio of the pixel change frame 102 to the entire (effective) screen, for example, 20%. As illustrated in FIG. 10, the pixel change frame 102 is about 10% less than the second threshold 20%, and the current frame #12 may be identified as a still image. When the pixel change frame is equal to or greater than 20%, which is the second threshold ("Yes" in operation S25), the image characteristic recognition in operation S26 may be performed.

Figure 11:
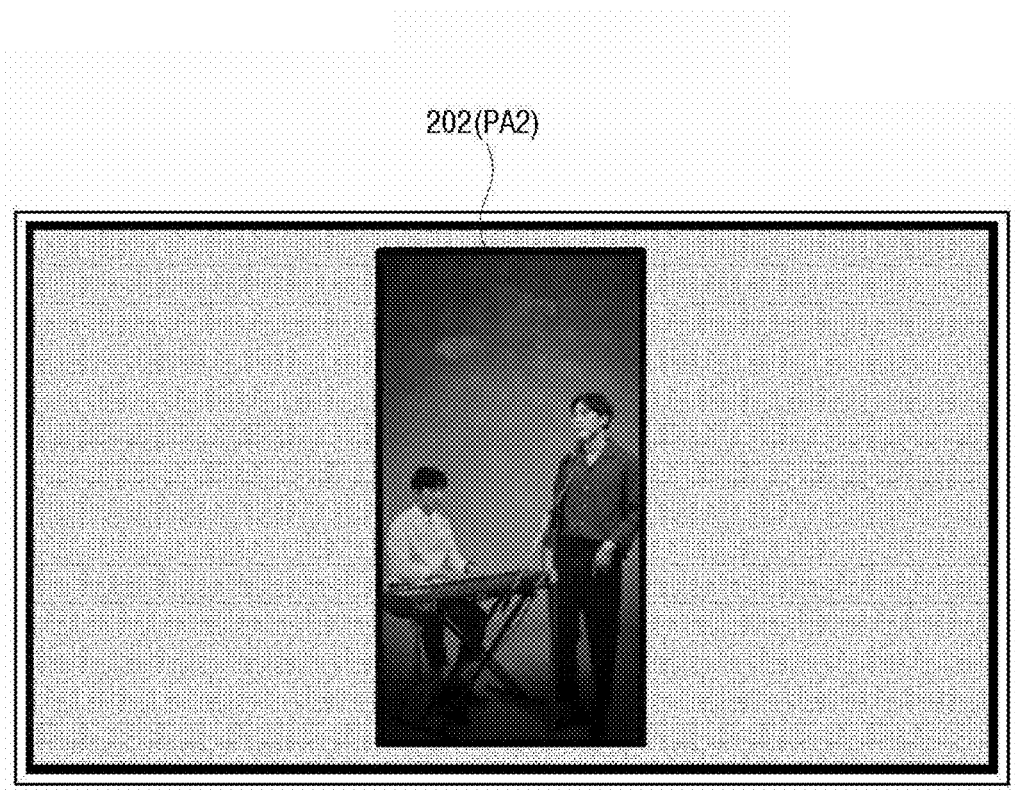
FIG. 11 is a diagram illustrating an example pixel change frame of another frame #22 according to various embodiments.

FIG. 11 is a diagram illustrating a pixel change frame 202 of another frame #22 according to various embodiments. As illustrated in FIG. 11, the characteristic recognition target identification module 162 may identify, as a moving image, the pixel change frame 202 that has the same size as the pixel change area PA2 and the area ratio to the effective screen which is about 30% greater than the second threshold 20%.

Figure 12:
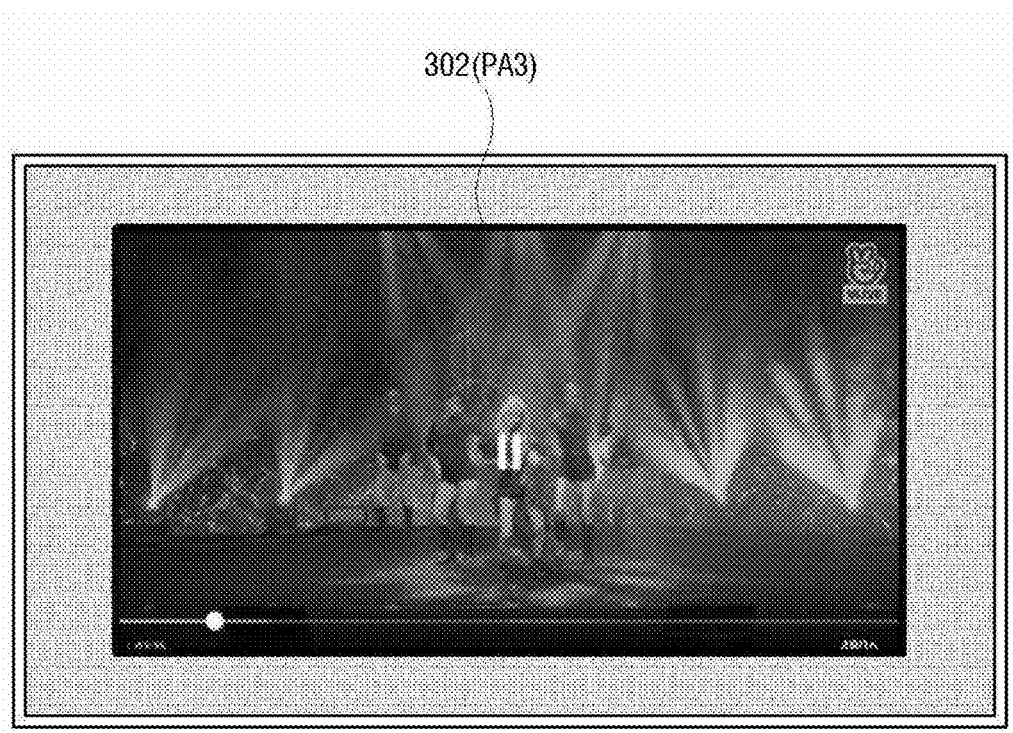
FIG. 12 is a diagram illustrating an example pixel change frame of another frame #32 according to various embodiments.

FIG. 12 is a diagram illustrating an example pixel change frame 302 of another frame #32 according to various embodiments. As illustrated in FIG. 12, the characteristic recognition target identification module 162 may identify, as a moving image, a pixel change frame 302 that has the same size PA3 as the pixel change area PA2 and the area ratio to the effective screen which is about 90% greater than the second threshold 20%.

Referring back to FIG. 7, in operation S26, the image characteristic recognition module 164 may perform image characteristic recognition on a current frame in which the pixel change frame 302 is greater than the second threshold 20%.

The image characteristic recognition module 164 may recognize motion information between two frames. The motion recognition may detect a ratio of similar feature points between two frames and determine whether the ratio of the similar feature points exceeds a third threshold. The image characteristic recognition module 164 may identify that when the ratio of the similar feature points is equal to or less than the third threshold, the scene change is made and when the ratio of the similar feature points exceeds the third threshold, the scene change is not made. When the current frame is not the scene change, the image characteristic recognition may be stopped, the current frame may be processed in the previous image quality mode, and the image characteristic recognition process for the next frame may be performed.

Figure 13:
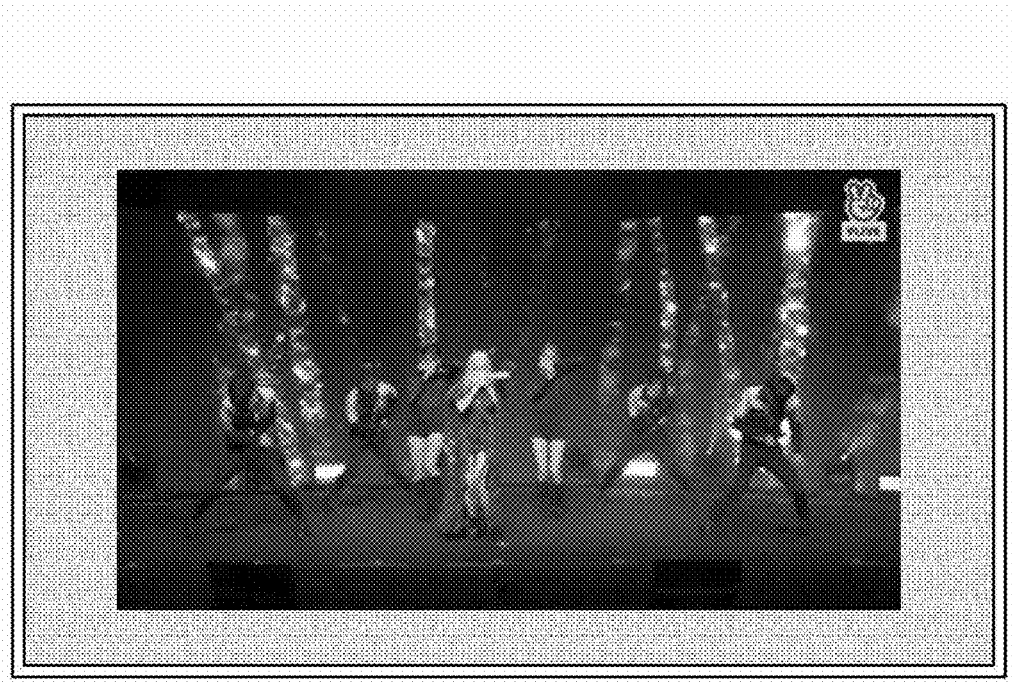
FIG. 13 is a diagram illustrating an example previous frame #41 according to various embodiments.
Figure 14:
FIG. 14 is a diagram illustrating another example current frame #52 according to various embodiments.
Figure 15:
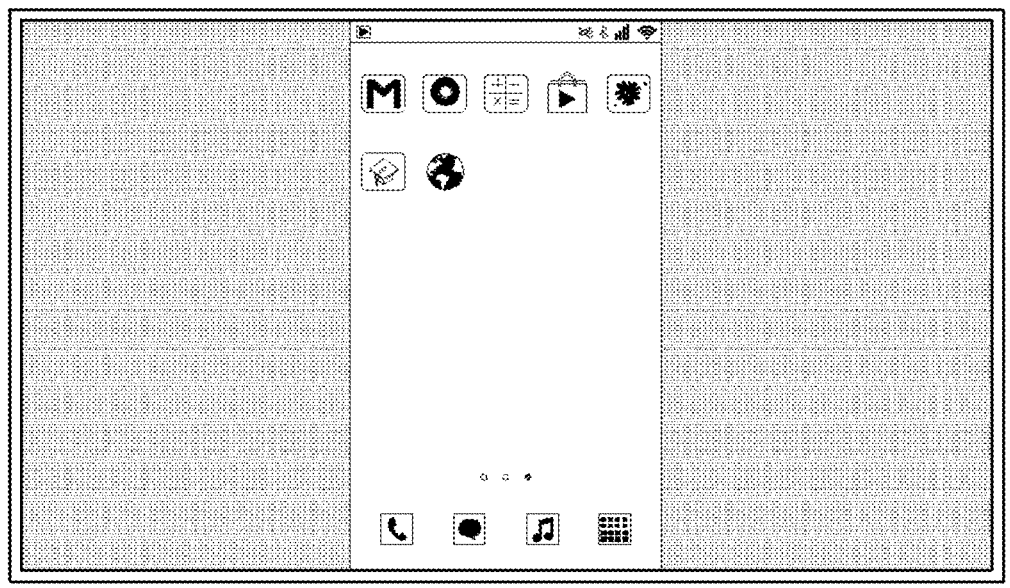
FIG. 15 is a diagram illustrating another example current frame #62 according to various embodiments.
Figure 16:
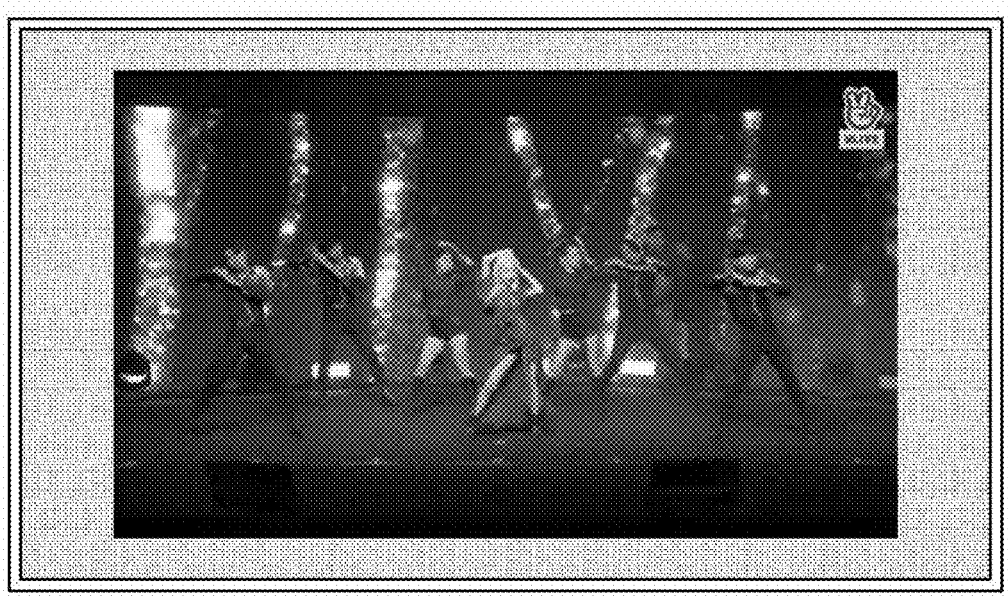
FIG. 16 is a diagram illustrating another example current frame #72 according to various embodiments.

FIG. 13 is a diagram illustrating another previous frame #41, and FIGS. 14, 15 and 16 are diagrams illustrating different current frames #52, #62, and #72, respectively.

Referring to FIG. 14, the current frame #52 is displayed by enlarging a specific area of the previous frame #41 of FIG. 13, and since the ratio of the similar feature points is equal to or less than the third threshold, it is recognized that the scene change is made and thus the image characteristic information recognition may be performed.

Referring to FIG. 15, the current frame #62 displays a UI image that has nothing to do with the specific area of the previous frame #41 of FIG. 13, and since the ratio of the similar feature points is equal to or less than the third threshold, it is recognized that the scene change is made, and thus the image characteristic information recognition may be performed.

Referring to FIG. 16, in the current frame #72, a finer scene change is detected compared to the previous frame #41 of FIG. 13, and since the ratio of the similar feature points exceeds the third threshold, it is recognized that the scene change is not made, so the current frame #72 is processed in the previous image quality mode without performing the image characteristic information recognition and the pixel change for the next frame may be detected.

The image characteristic recognition module 164 may extract the vector information from the two consecutive frames and recognize the motion information from the extracted vector information to recognize the screen state such as the size of the motion and the ratios for each recognition direction.

Referring back to FIG. 7, in operation S27, the image characteristic recognition module 164 recognizes the screen information by performing the image recognition on the current frame among the two consecutive frames. In this case, the image recognition may identify whether the frames are the content image or the UI image using the deep learning-based learned model.

In operation S28, the image characteristic recognition module 164 may determine whether the current frame is a still image or a moving image based on the recognized screen state and screen information.

In operation S29, the image quality mode determination module 166 may determine an image quality mode suitable for the current frame #12 corresponding to the still image or the moving image identified by the above-described method.

The electronic device 1 according to an embodiment may lower the misrecognition rate and reduce the CPU computational capacity, the occupancy rate, and the like by performing the image characteristic recognition only on the frame in which the scene change is detected.

Figure 17:
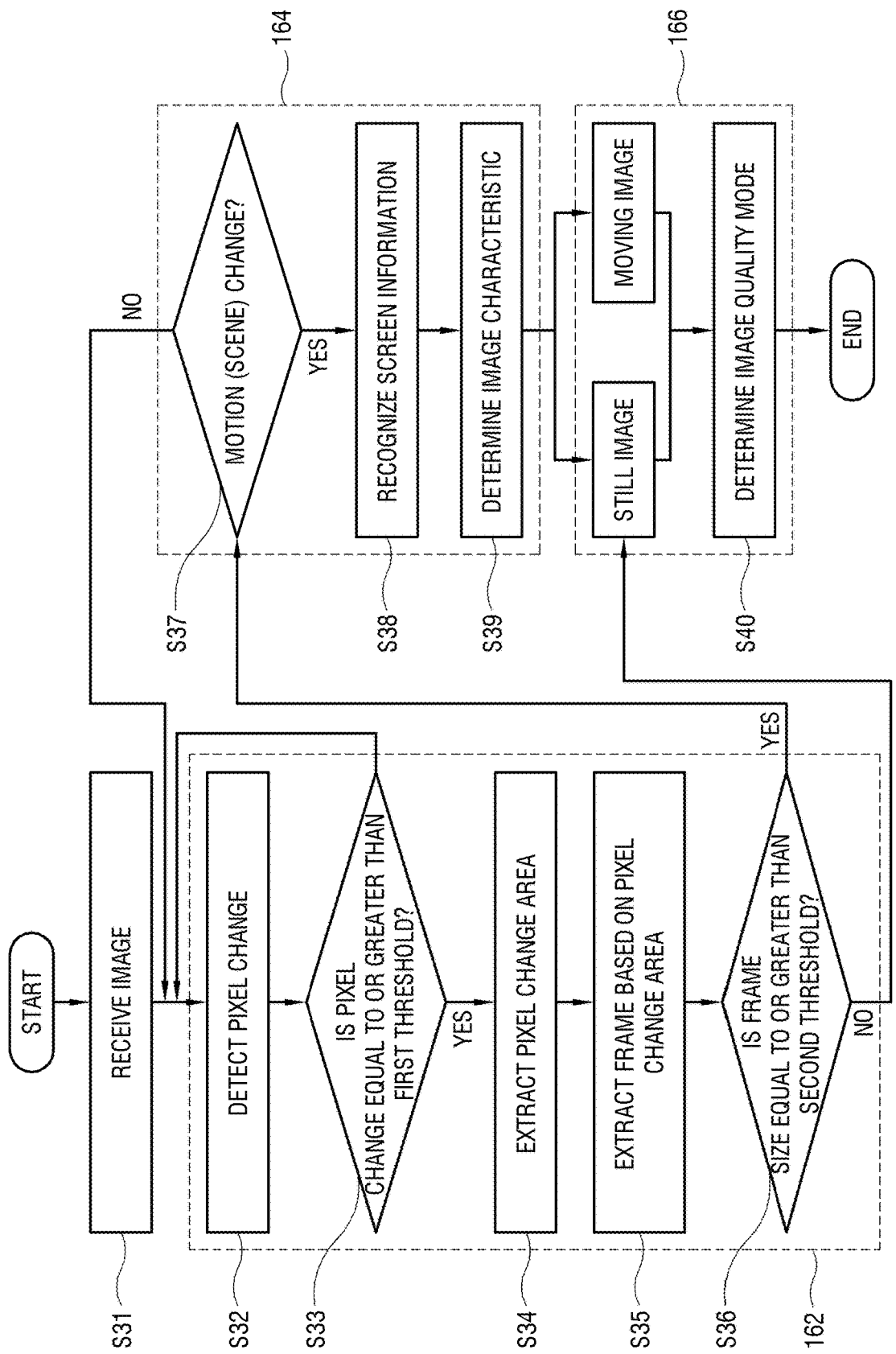
FIG. 17 is a flowchart illustrating an example method for processing an image in an optimal quality mode according to various embodiments.

FIG. 17 is a flowchart illustrating an example method for processing an image in an optimal quality mode according to a third embodiment of the disclosure.

In operation S31, the electronic device 1 may receive an image through the interface circuitry 11. The received image may include a plurality of frames #11 to #1N.

In operation S32, the characteristic recognition target identification module 162 may detect a pixel change between continuous previous frame #11 and current frame #12 among the plurality of frames #11 to #1N. That is, the characteristic recognition target identification module 162 may detect different pixels by comparing pixels of the previous frame #11 with pixels of the current frame #12.

In operation S33, the characteristic recognition target identification module 162 may identify whether the pixel change in operation S32 is equal to or greater than a first threshold. When the pixel change is below the first threshold ("No" in operation S33), the characteristic recognition target identification module 162 may not perform image characteristic recognition in operation S34, apply the previous image quality mode, and detect the pixel change between the next two frames #12 and #13. When the pixel change is equal to or greater than the first threshold ("Yes" in operation S33), the characteristic recognition target identification module 162 may perform image characteristic recognition in operation S34. Here, the first threshold may be set as the number of pixels of the current frame #12 that are different from the pixels of the previous frame #1.

In operation S34, the characteristic recognition target identification module 162 may extract a pixel change area PA1 of the current frame #12. The pixel change area PA1 may be formed by connecting outermost pixels among the changed pixels of the current frame #12. Referring to FIG. 9, the current frame #12 includes a quadrangular pixel change area PA1.

In operation S35, the characteristic recognition target identification module 162 may extract the pixel change frame 102 based on the pixel change area PAL Referring to FIG. 10, the pixel change frame 102 includes the pixel change area PA1 as a part of the current frame #12. In this case, the pixel change frame 102 may be the same as the pixel change area PA1 or the current frame #12.

In operation S36, the characteristic recognition target identification module 162 may determine whether the pixel change frame 102 is equal to or greater than the second threshold. Here, the second threshold may be set as an area ratio of the pixel change frame 102 to the entire (effective) screen. When the pixel change frame 102 is less than the second threshold ("No" in operation S36), the current frame #12 may be identified as a still image. When the pixel change frame is equal to or greater than the second threshold ("Yes" in operation S36), the image characteristic recognition in operation S37 may be performed.

In operation S37, the image characteristic recognition module 164 may perform image characteristic recognition on a current frame in which the pixel change frame 302 is greater than the second threshold.

The image characteristic recognition module 164 may recognize motion information between two frames. The motion recognition may detect a ratio of similar feature points between two frames and determine whether the ratio of the similar feature points exceeds a third threshold. The image characteristic recognition module 164 may identify that when the ratio of the similar feature points is equal to or smaller than the third threshold, the scene change is made and when the ratio of the similar feature points exceeds the third threshold, the scene change is not made. When the current frame is not the scene change ("No" in operation S37), the image characteristic recognition may be stopped, the current frame may be processed in the previous image quality mode, and the image characteristic recognition process for the next frame may be performed.

When the scene change is identified ("Yes" in operation S37), the image characteristic recognition module 164 may extract vector information from the two frames #11 and #12 and recognize motion information from the extracted vector information to recognize a screen state such as the size of the motion and the ratios for each recognition direction.

In operation S38, the image characteristic recognition module 164 recognizes the screen information by performing the image recognition on the current frame #12 among the two consecutive frames #11 and #12. The image characteristic recognition module 164 may use a deep learning-based learned model and may identify image information as to whether the frames are a content image or a UI image.

In operation S39, the image characteristic recognition module 164 may determine whether the current frame is a still image or a moving image based on the recognized screen state and screen information.

In operation S40, the image quality mode determination module 166 may determine an image quality mode suitable for the current frame #12 corresponding to the still image or the moving image identified by the above-described method.

As described above, the electronic device 1 according to an embodiment may primarily identify whether to perform the image characteristic recognition according to the number of pixels changed between the two frames, and secondly identify whether to perform the image characteristic recognition according to whether or not to perform the scene change between the two frames, so it is possible to more elaborately select the image characteristic recognition target.

Figure 18:
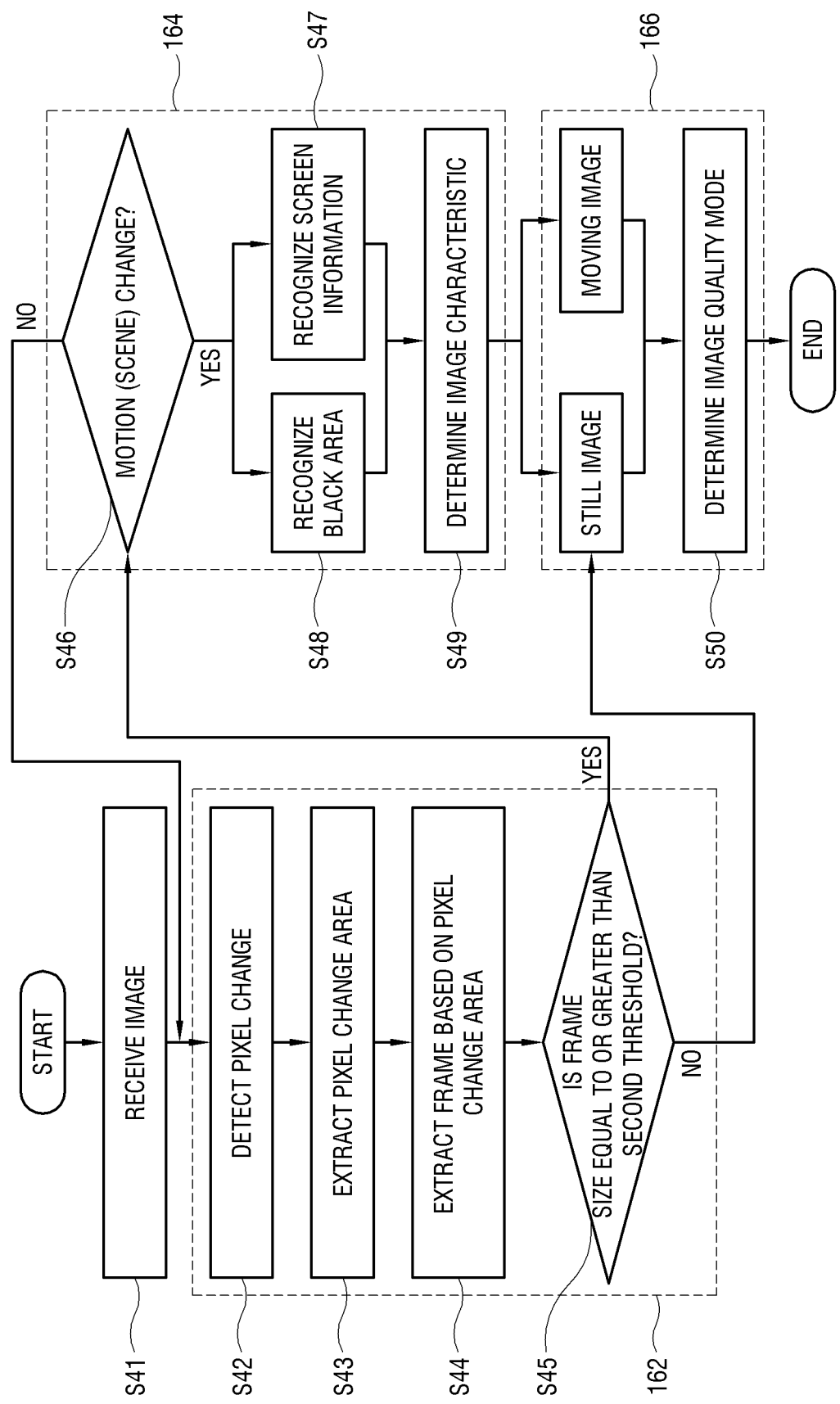
FIG. 18 is a flowchart illustrating an example method for processing an image in an optimal quality mode according to various embodiments.
Figure 19:
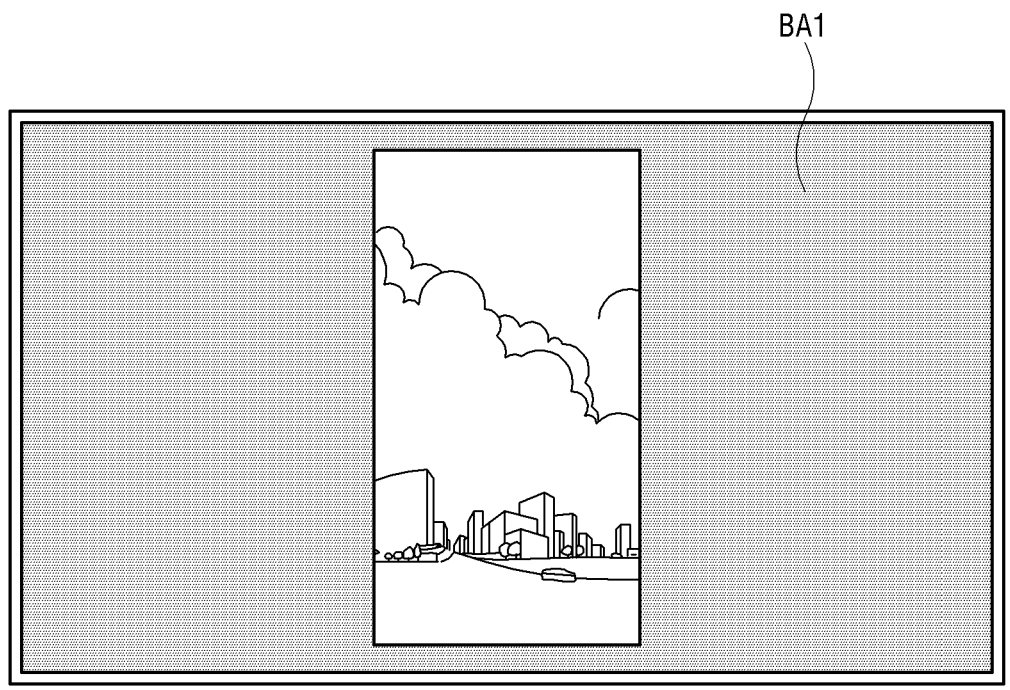
FIG. 19 is a diagram illustrating an example previous frame #81 according to various embodiments.
Figure 20:
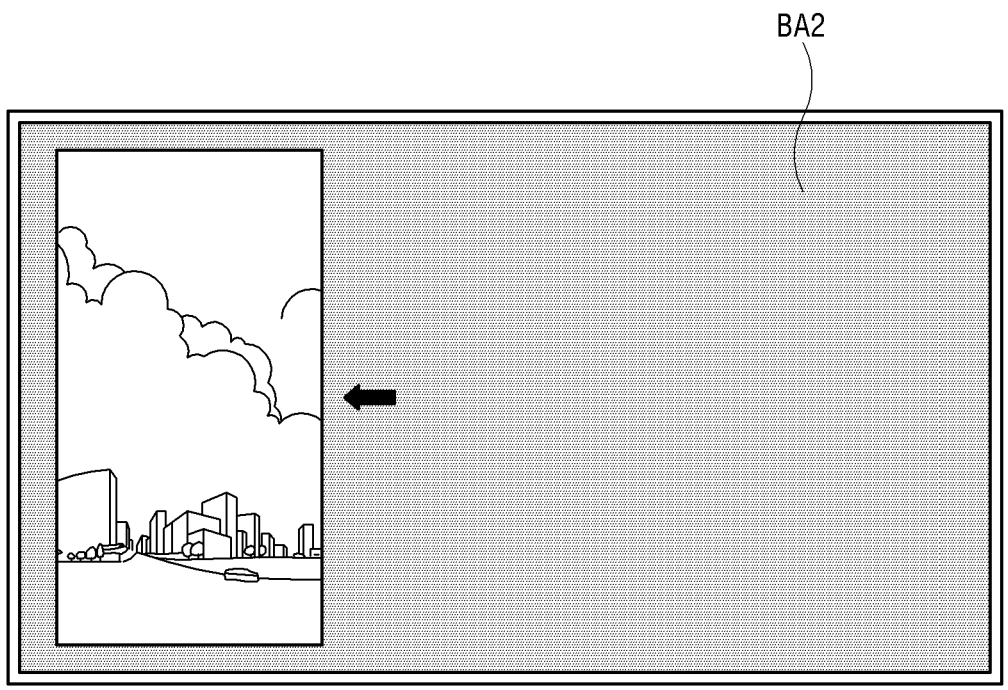
FIG. 20 is a diagram illustrating an example current frame #82 according to various embodiments.

FIG. 18 is a flowchart illustrating an example method for processing an image in an optimal quality mode according to various embodiments, and FIGS. 19 and 20 are diagrams illustrating two consecutive frames #81 and #82, respectively, according to various embodiments.

In operation S41, the electronic device 1 may receive an image through the interface circuitry 11.

In operation S42, the characteristic recognition target identification module 162 may detect a pixel change between continuous previous frame #81 and current frame #82 among the plurality of frames #81 to #8N. That is, the characteristic recognition target identification module 162 may detect different pixels by comparing pixels of the previous frame #81 with pixels of the current frame #82.

In operation S43, the characteristic recognition target identification module 162 may extract a pixel change area of the current frame #82. The pixel change area may be formed by connecting outermost pixels among the changed pixels of the current frame #82.

In operation S44, the characteristic recognition target identification module 162 may extract the pixel change frame 102 based on the pixel change area.

In operation S45, the characteristic recognition target identification module 162 may determine whether the pixel change frame 102 is equal to or greater than the second threshold. Here, the second threshold may be set as an area ratio of the pixel change frame 102 to the entire (effective) screen. When the pixel change frame 102 is less than the second threshold ("No" in operation S45), the current frame #82 may be identified as a still image. When the pixel change frame is equal to or greater than the second threshold ("Yes" in operation S45), the image characteristic recognition in operation S46 may be performed.

In operation S46, the image characteristic recognition module 164 may perform image characteristic recognition on a current frame in which the pixel change frame 302 is greater than the second threshold.

The image characteristic recognition module 164 may recognize motion information between two frames. The motion recognition may detect a ratio of similar feature points between two frames and determine whether the ratio of the similar feature points exceeds a third threshold. The image characteristic recognition module 164 may identify that when the ratio of the similar feature points is equal to or smaller than the third threshold, the scene change is made and when the ratio of the similar feature points exceeds the third threshold, the scene change is not made. When the current frame is not the scene change, the image characteristic recognition may be stopped, the current frame may be processed in the previous image quality mode, and the image characteristic recognition process for the next frame may be performed.

When the scene change is identified ("Yes" in operation S46), the image characteristic recognition module 164 may extract vector information from the two frames #81 and #82 and recognize motion information from the extracted vector information to recognize a screen state such as the size of the motion and the ratios for each recognition direction.

In operation S47, the image characteristic recognition module 164 recognizes the screen information by performing the image recognition on the current frame #82 among the two consecutive frames #81 and #82. The image characteristic recognition module 164 may use a deep learning-based learned model and may identify image information as to whether the frames are a content image or a UI image.

In operation S48, the image characteristic recognition module 164 may detect a change ratio of black areas BA1 and BA2 compared to the effective screen displaying the two frames #81 and #82. In this case, when the change ratio of the black areas of the two frames #81 and #82 is equal to or greater than a predetermined fourth threshold, the frames #81 and #82 may be determined as a still image.

Referring to FIGS. 19 and 20, the two frames #81 and #82 are frames, which are not by a conversion of content itself, but only the simple movement. Accordingly, the image characteristic recognition module 164 may process the frames #81 and #82 as a still image even if the scene change occurs due to the movement of the content.

In operation S49, the image characteristic recognition module 164 may determine whether the current frame is a still image or a moving image based on the recognized screen state, screen information, and back area information.

In operation S50, the image quality mode determination module 166 may determine an image quality mode suitable for the current frame #12 corresponding to the still image or the moving image identified by the above-described method.

Figure 21:
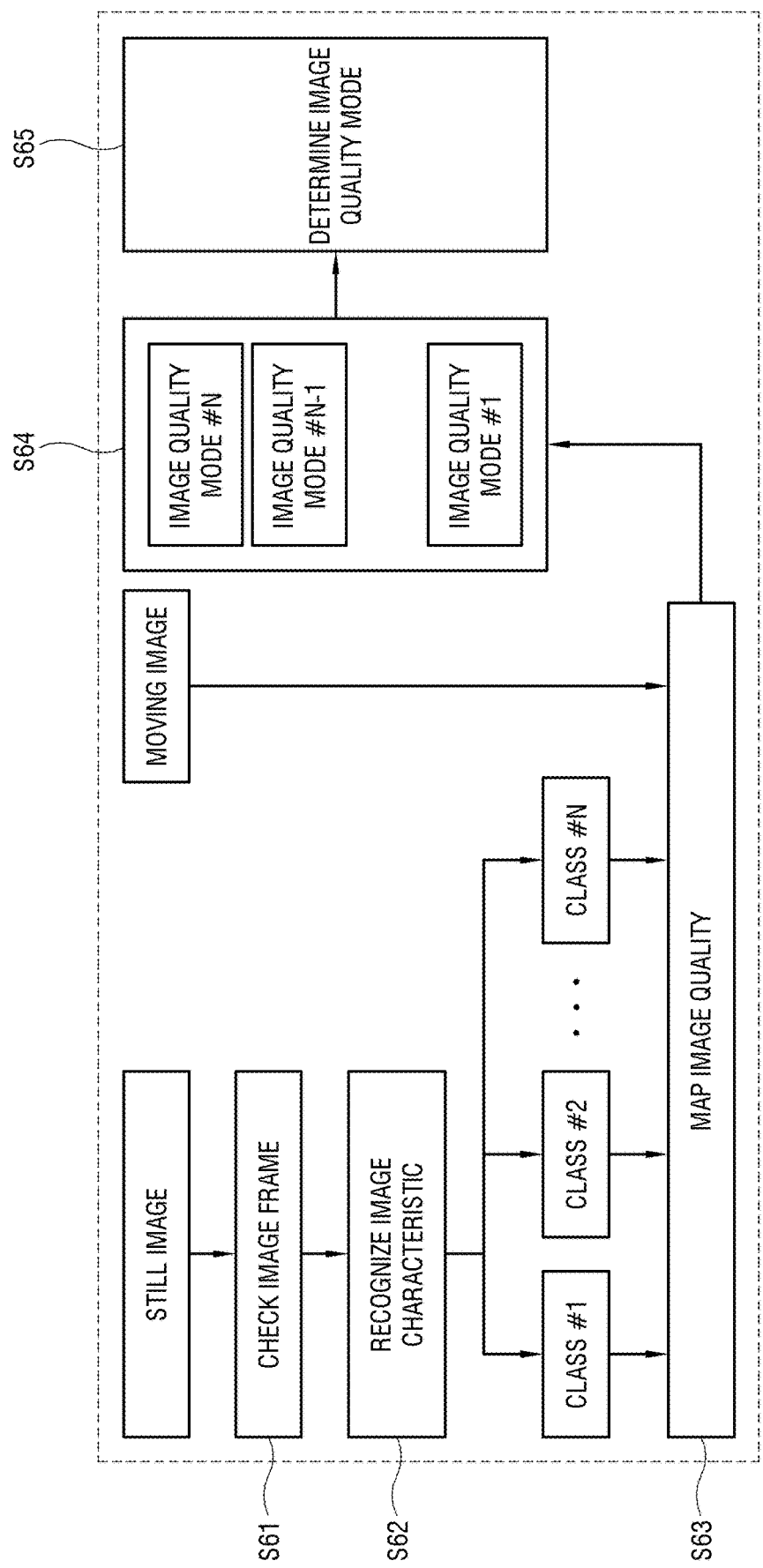
FIG. 21 is a flowchart illustrating an example method for selecting an image quality mode suitable for a still image or a moving image according to various embodiments.

FIG. 21 is a flowchart illustrating an example method for selecting an image quality mode suitable for a still image or a moving image identified in the various embodiments.

In operation S61, the image quality mode determination module 166 may check a size of a frame for an image corresponding to the identified still image, that is, a UI image, a Web image, a text image, a gallery image, and the like.

In operation S62, the image quality mode determination module 166 may perform additional image characteristic recognition on an image having a size of a frame equal to or greater than the fourth threshold. The image quality mode determination module 166 may detect a target scene or a target object in the current frame through the additional image characteristic recognition, and classify the image into preset classes #1 to #N according to the detected target scene or target object.

In operation S63, the image quality mode determination module 166 may map the image whose class is classified to the predefined image quality mode. In addition, the image quality mode determination module 166 may map an image identified as a moving image to a predefined image quality mode.

In operation S64, the image quality mode determination module 166 may store the image mapped to the predefined image quality mode in the image quality stack.

In operation S65, the image quality mode determination module 166 may select the largest number of image quality modes among the image quality modes stored in the image quality mode stack as a final image quality mode.

As described above, by detecting the size of the frame of the image identified as the still image and subdividing only the image having a predetermined size or larger through the additional image characteristic information recognition, the optimal image quality mode may be applied to an actual still image.

Figure 22:
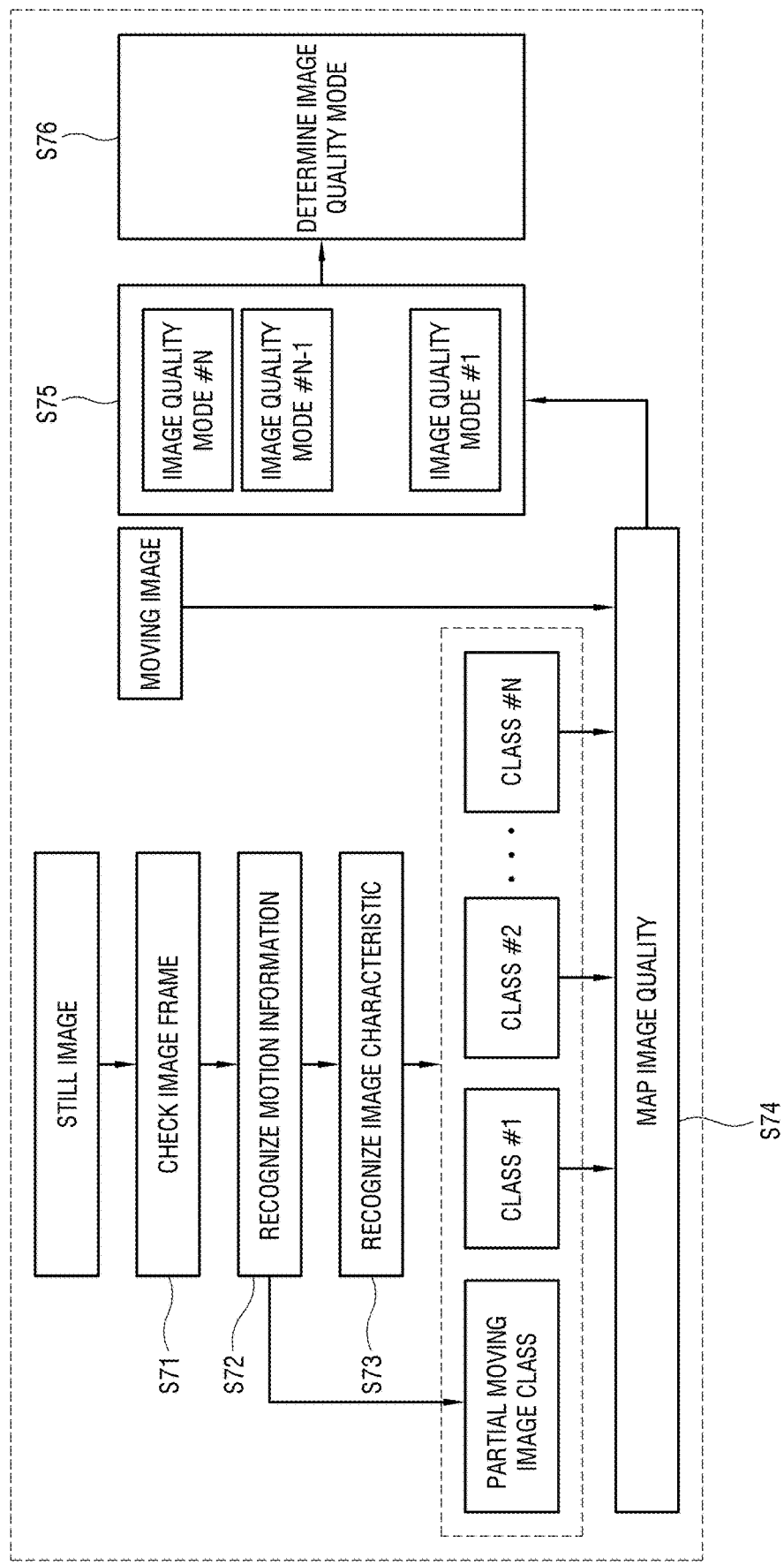
FIG. 22 is a flowchart illustrating an example method for selecting an image quality mode suitable for a still image or a moving image according to various embodiments.

FIG. 22 is a flowchart illustrating an example method for selecting an image quality mode suitable for a still image or a moving image according various embodiments.

In operation S71, the image quality mode determination module 166 may check a size of a frame for an image corresponding to the identified still image, that is, a UI image, a Web image, a text image, a gallery image, and the like.

In operation S72, the image quality mode determination module 166 may perform motion information recognition on an image having a size of a frame equal to or greater than the fourth threshold. The image quality mode determination module 166 may identify whether the image identified as the still image is a still image as a whole or the moving image is included in a specific region through the motion information recognition. When the image is identified as the image including the moving image in the specific area, the image quality mode determination module 166 may classify the image into one of separate classes. As a result, the partial moving image class is processed to be suitable for the image quality of the still image quality as a whole, but only a specific area is processed to be suitable for the image quality of the moving image, so the partial moving image class can be processed in the image quality mode suitable for the image characteristic.

In operation S73, the image quality mode determination module 166 may perform additional image characteristic recognition when the mage is the still image as a whole. The image quality mode determination module 166 may detect a target scene or a target object in the current frame through the additional image characteristic recognition, and classify the image into preset classes #1 to #N according to the detected target scene or target object.

In operation S74, the image quality mode determination module 166 may map the image whose class is classified to the predefined image quality mode. In addition, the image quality mode determination module 166 may map an image identified as a moving image to a predefined image quality mode.

In operation S75, the image quality mode determination module 166 may store the image mapped to the predefined image quality mode in the image quality stack.

In operation S76, the image quality mode determination module 166 may select the largest number of image quality modes among the image quality modes stored in the image quality mode stack as a final image quality mode.

As described above, even when a moving image is included in the specific area of the image processed as the still image, a more optimal image quality mode may be provided to the user by applying the image quality mode in consideration of both the still image and the moving image.

The electronic device 1 according to an embodiment of the disclosure can provide, as the optimal image quality mode, not only images transmitted from the mobile device 2 in a screen mirroring method, but also images transmitted through the interface circuitry 11 in a streaming method and images transmitted in a download method.

The optimal image quality mode service module according to an embodiment of the disclosure may be implemented as a computer program product stored in the first memory 13 as a computer-readable storage medium or a computer program product transmitted and received through network communication. In addition, the above-described image quality mode service modules may be implemented as a computer program alone or integrated.

The computer program according to the embodiment of the disclosure may execute the detection of the pixel change between the two consecutive frames in the image based on the plurality of frames, and the recognition of the predefined characteristic based on the frame in which the pixel change is equal to or greater than the threshold.

As described above, the electronic device according to the disclosure may perform the image characteristic recognition on the frame in which the pixel change between the two consecutive frames is equal to or greater than the threshold to lower the misrecognition rate that may occur and reduce the CPU computational capacity and the occupancy rate, thereby providing the advantage in securing the shared resources.

In addition, the electronic device according to the disclosure can provide the optimal image quality to the user by processing it as a still image even if the pixel change due to the user manipulation on the still image is large in the screen mirroring that displays the image of the mobile device on the electronic device.

The electronic device according to the disclosure may provide the optimal image quality to the user by processing the thumbnail and the small-sized moving image as the still image even if the thumbnail and the small-sized moving image are is included in the web or the UI image.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device, comprising:
   a display; and
   a processor configured to control the electronic device to:
   control the display to display a first frame among a plurality of frames of an image based on a first image quality mode,
   based on at least one of a scene change or a motion change being not identified between the first frame and a second frame which is subsequent to the first frame, determine that the second frame is not a subject to be identified as a still image frame and/or a moving image frame, and display the second frame based on the first image quality mode which is applied to the first frame without identifying whether the second frame is the still image frame and/or the moving image frame; and based on the at least one of the scene change or the motion change being identified between the first frame and the second frame, determine that the second frame is the subject to be identified as the still image frame or the moving image frame, identify whether the second frame is the still image frame or the moving image frame, and display the second frame based on a second image quality mode according to identification that the second frame is the still image frame or the moving image frame the second image quality mode being different from the first image quality mode; and wherein the image is determined to be a still image based on the change of the detected black area of the effective screen of the two consecutive frames being equal to or greater than the third threshold and the identified characteristic of the frame indicating that the image includes a user interface.

2. The electronic device of claim 1, wherein the processor is configured to detect a pixel change area between the first and second frames.

3. The electronic device of claim 1, wherein the processor is configured to process the image, in which a pixel change between the first and second images is less than a threshold, in a previous image quality mode.

4. The electronic device of claim 1, wherein the processor is configured to compare a ratio of similar feature points to recognize a characteristic.

5. The electronic device of claim 1, wherein the processor is configured to identify the first and second frames as a still image or a moving image based on a difference in the detected black area between the first and the second frames.

6. The electronic device of claim 1, wherein the processor is configured to identify whether the second frame is a content image or a UI image.

7. The electronic device of claim 1, wherein the processor is configured to identify whether the second image is a still image or a moving image based on the characteristic recognition result.

8. The electronic device of claim 2, wherein the pixel change area is defined by connecting a plurality of outer pixels among pixels changed between the first and second frames.

9. The electronic device of claim 4, wherein the recognition of the characteristic includes at least one of recognition of scene change information and recognition of motion information.

10. The electronic device of claim 7, wherein the processor is configured to detect a frame size of a still image, and to perform additional characteristic recognition on a frame having a predetermined size or larger.

11. The electronic device of claim 8, wherein a third threshold includes a threshold of a ratio of the pixel change area to an effective screen area.

12. The electronic device of claim 10, wherein the additional characteristic recognition includes detecting at least one of a target scene or a target object.

13. The electronic device of claim 11, wherein the processor is configured to process an image, in which the ratio of the pixel change area is less the third threshold, in a previous image quality mode.

14. The electronic device of claim 12, wherein the processor is configured to classify and map the at least one of the target scene or the target object into a predefined class based on the detecting of at least one of the target scene and the target object.

15. An electronic device, comprising:
a display;
interface circuitry; and
a processor configured to control the electronic device to:
process a signal received from an external display apparatus through the interface circuitry, the signal to correspond to an image displayed on the external display apparatus;
control the display to display a mirrored image based on the processed signal, the mirrored image comprising a plurality of frames;
identify a size of an area in which a pixel change between two consecutive frames among the plurality of frames is greater than or equal to a first threshold;
based on a ratio of the identified size of the area to a size of a frame of the consecutive frames being greater than or equal to a second threshold, detect each black area of an effective screen displaying the two consecutive frames, perform recognition of a characteristic of the frame at least by performing recognition of the characteristic of the frame based on a deep learning model, determine a change ratio of the detected black areas of the two consecutive frames, identify whether the image is a still image or a moving image based on the identified characteristic of the frame and comparing the determined change ratio of the detected black area of the effective screen of the two consecutive frames to a third threshold, and display the frame of the two consecutive frames based on the identifying whether the image is a still image or a moving image and a predetermined image quality mode of a still image or a moving image; and based on the ratio of the identified size of the area to the size of the frame being less than the second threshold, display the frame based on the predetermined image quality mode of the still image without performing the recognition of the characteristic of the image and the detecting of each black area of the effective screen displaying the two consecutive frames, wherein the image is determined to be a still image based on the change of the detected black area of the effective screen of the two consecutive frames being equal to or greater than the third threshold and the identified characteristic of the frame indicating that the image includes a user interface.

16. The electronic device of claim 15, wherein the image includes a mirrored image of an image displayed by an external device.

17. A method for controlling an electronic apparatus, the method comprising:
controlling a display of the electronic apparatus to display a first frame among a plurality of frames of an image based on a first image quality mode,
based on at least one of a scene change or a motion change being not identified between the first frame and a second frame which is subsequent to the first frame, determining that the second frame is not a subject to be identified as a still mage and/or a moving image frame, and displaying the second frame based on the first image quality mode which is applied to the first frame without identifying whether the second frame is the still image frame and/or the moving image frame; and based on the at least one of the scene change or the motion change being identified between the first frame and the second frame, determining that the second frame is the subject to be identified as the still image frame or the moving image frame, identifying whether the second frame is the still image frame or the moving image frame, and displaying the second frame based on a second image quality mode according to identification that the second frame is the still image frame or the moving image frame, the second image quality mode being different from the first image quality mode; and wherein the image is determined to be a still image based on the change of the detected black area of the effective screen of the two consecutive frames being equal to or greater than the third threshold and the identified characteristic of the frame indicating that the image includes a user interface.

18. A non-transitory computer-readable storage medium having stored thereon an executable computer program, wherein the computer program, when executed by a processor included in an electronic apparatus, performs at least one operation comprising:

controlling a display of the electronic apparatus to display a first frame among a plurality of frames of an image based on a first image quality mode, based on at least one of a scene change or a motion change being not identified between the first frame and a second frame which is subsequent to the first frame, determining that the second frame is not a subject to be identified as a still image and/or a moving image frame, and displaying the second frame based on the first image quality mode which is applied to the first frame without identifying whether the second frame is the still image and/or the moving; and based on the at least one of the scene change or the motion change being identified between the first frame and the second frame, determining that the second frame is the subject to be identified as the still image frame or the moving image frame, identifying whether the second frame is the still image frame or the moving image frame, and displaying the second frame based on a second image quality mode according to identification that the second frame is the still image frame or the moving image frame, the second image quality mode being different from the first image quality mode; and wherein the image is determined to be a still image based on the change of the detected black area of the effective screen of the two consecutive frames being equal to or greater than the third threshold and the identified characteristic of the frame indicating that the image includes a user interface.

\* \* \* \* \*